US012562042B2

(12) United States Patent
Yamazaki et al.

(10) Patent No.: US 12,562,042 B2
(45) Date of Patent: Feb. 24, 2026

(54) INFORMATION PROCESSING DEVICE, TERMINAL, INFORMATION PROCESSING METHOD, ALARM METHOD, AND ALARM SYSTEM

(71) Applicant: Panasonic Intellectual Property Management Co., Ltd., Osaka (JP)

(72) Inventors: Yasuhisa Yamazaki, Kanagawa (JP); Jun Shibata, Kanagawa (JP); Kazuyuki Yoshino, Tokyo (JP); Naoto Horiike, Tokyo (JP); Yoshihito Kawai, Kanagawa (JP); Yoshimasa Shirosaki, Kanagawa (JP); Atsuki Tsunobuchi, Kanagawa (JP); Noriyuki Gejoh, Tokyo (JP); Hiroaki Sudo, Kanagawa (JP); Kazuhiro Kosaka, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 30 days.

(21) Appl. No.: 18/727,385

(22) PCT Filed: Oct. 6, 2022

(86) PCT No.: PCT/JP2022/037480
§ 371 (c)(1),
(2) Date: Jul. 9, 2024

(87) PCT Pub. No.: WO2023/135875
PCT Pub. Date: Jul. 20, 2023

(65) Prior Publication Data
US 2025/0078639 A1 Mar. 6, 2025

(30) Foreign Application Priority Data
Jan. 14, 2022 (JP) ................................. 2022-004439

(51) Int. Cl.
| | |
|---|---|
| *G08B 21/02* | (2006.01) |
| *E02F 9/26* | (2006.01) |
| *G01S 19/43* | (2010.01) |
| *G08B 25/10* | (2006.01) |
| *H04W 4/021* | (2018.01) |

(52) U.S. Cl.
CPC .............. *G08B 21/02* (2013.01); *E02F 9/261* (2013.01); *G01S 19/43* (2013.01); *G08B 25/10* (2013.01); *H04W 4/022* (2013.01)

(58) Field of Classification Search
CPC .... G08B 21/02; G08B 25/10; G08B 21/0225; G08B 21/0236; G08B 21/0269; H04W 4/022; H04W 4/02; E02F 9/261
See application file for complete search history.

(56) References Cited

U.S. PATENT DOCUMENTS

| | | | | |
|---|---|---|---|---|
| 12,000,117 B2 * | 6/2024 | Yamada | .................. | E02F 9/262 |
| 2020/0217049 A1 | 7/2020 | Mizuochi et al. | | |

(Continued)

FOREIGN PATENT DOCUMENTS

| | | |
|---|---|---|
| EP | 3702539 | 9/2020 |
| JP | 2018-111937 | 7/2018 |

(Continued)

OTHER PUBLICATIONS

International Search Report issued in International Pat. Appl. No. PCT/JP2022/037480, dated Dec. 20, 2022, along with an English translation thereof.

(Continued)

*Primary Examiner* — John A Tweel, Jr.
(74) *Attorney, Agent, or Firm* — Greenblum & Bernstein, P.L.C.

(57) ABSTRACT
Provided is an information processing device comprising: a processing unit that dynamically sets an area in a portion of the surroundings of a first terminal including the position of the first terminal on the basis of a state of a moving body (Continued)

FORWARD

A2

A1 mounting the first terminal and the position of the first terminal and determines entry of a second terminal into or approach of the second terminal to the area; and a communication unit that transmits, to the second terminal, a signal for causing the second terminal to issue an alarm in response to the entry or the approach.

14 Claims, 20 Drawing Sheets

(56)                     References Cited

U.S. PATENT DOCUMENTS

| | | |
|---|---|---|
| 2021/0295460 A1 | 9/2021 | Tamazato |
| 2022/0043617 A1 | 2/2022 | Kamimura et al. |
| 2022/0051150 A1 | 2/2022 | Watanabe et al. |

FOREIGN PATENT DOCUMENTS

| | | |
|---|---|---|
| JP | 2019-060108 | 4/2019 |
| JP | 6520318 | 5/2019 |
| JP | 2020-051092 | 4/2020 |
| JP | 2020-166540 | 10/2020 |
| KR | 2020-0022229 | 3/2020 |
| WO | 2019/117268 | 6/2019 |

OTHER PUBLICATIONS

Extended European Search Report dated Apr. 11, 2025 issued in European patent application No. 22920398.

* cited by examiner

20'

FORWARD

BACKWARD

ARM RIGHTWARD ROTATION

A5

ARM LEFTWARD ROTATION

A6

INFORMATION PROCESSING DEVICE, TERMINAL, INFORMATION PROCESSING METHOD, ALARM METHOD, AND ALARM SYSTEM

TECHNICAL FIELD

The present disclosure relates to an information processing apparatus, a terminal, an information processing method, an alarm method, and an alarm system.

BACKGROUND ART

There are techniques for setting a specific area as a "geofence", which refers to an area defined by a virtual boundary, and causing an event to occur when a mobile object enters or exits the geofence. For example, there are techniques for outputting an alarm for entry or exit of a mobile object into or from a geofence.

PTL 1, for example, discloses a technique for outputting an alarm instruction when there is at least one worker who is a target of approach notification in an approach notification area, which is an example of a geofence, and not outputting an alarm instruction when there is no such worker. PTL 1 also discloses that a type of alarm is changed stepwise at this time in accordance with information such as the number of workers detected in the approach notification area and distances to a hydraulic excavator.

CITATION LIST

Patent Literature

PTL 1
WO 2019/117268

SUMMARY OF INVENTION

As described above, a determination whether to give an alarm to a person carrying a mobile object is based solely on a distance between a geofence and the mobile object, and elements other than the distance are not taken into account. For example, when alarms are given even when a geofence and a mobile object are far from each other, safety is likely to be ensured, but alarms are likely to be excessively output. When alarm are given only when a geofence and a mobile object are close to each other, on the other hand, excessive output of alarms is likely to be suppressed but safety is unlikely to be ensured. In addition, geofences are generally set as predefined fixed areas, but there might be cases where geofences are associated with other mobile objects (automobiles etc.). In such cases, there is room to consider elements other than a distance between a geofence and a mobile object to contribute to appropriate setting of the geofence that results in a better balance between excessive output of alarms and ensuring of safety.

Non-limiting embodiments of the present disclosure contribute to providing an information processing apparatus, a terminal, an information processing method, an alarm method, and an alarm system capable of appropriately giving alarms to persons associated with mobile objects, such as persons carrying mobile objects and persons driving vehicles on which mobile objects are mounted.

An information processing apparatus according to one example of the present disclosure includes: a processor that dynamically sets an area somewhere around a first terminal including a position of the first terminal based on a state of a mobile object on which the first terminal is mounted and the position of the first terminal and that determines entry or approach of a second terminal to the area; and a communicator that transmits, to the second terminal, a signal for causing the second terminal to output an alarm for the entry or the approach.

A terminal according to one example of the present disclosure includes: a processor that determines a position of the terminal; and an alarmer that outputs an alarm for entry or approach of the terminal to an area dynamically set at least somewhere around another terminal including a position of the other terminal, the other terminal being different from the terminal and mounted on a mobile object, in which the area is dynamically set based on a state of the mobile object and the position of the other terminal.

An information processing method according to one example of the present disclosure is a method performed by an information processing apparatus and including: dynamically setting an area somewhere around a first terminal including a position of the first terminal based on a state of a mobile object on which the first terminal is mounted and the position of the first terminal; determining entry or approach of a second terminal to the area; and transmitting, to the second terminal, a signal for causing the second terminal to output an alarm for the entry or the approach.

An alarm method according to one example of the present disclosure is a method used by a terminal and including: determining a position of the terminal; and outputting an alarm for entry or approach of the terminal to an area dynamically set at least somewhere around another terminal including a position of the other terminal, the other terminal being different from the terminal and mounted on a mobile object, in which the area is dynamically set based on a state of the mobile object and the position of the other terminal.

An alarm system according to one example of the present disclosure includes: a first terminal; and a second terminal, in which the alarm system dynamically sets an area somewhere around the first terminal including a position of the first terminal based on a state of a mobile object on which the first terminal is mounted and the position of the first terminal, in which the alarm system determines entry or approach of the second terminal to the area, in which the alarm system performs at least one of processing for transmitting, to the first terminal, a first signal for causing the first terminal to output a first alarm and processing for transmitting, to the second terminal, a second signal for causing the second terminal to output a second alarm, in which the first terminal outputs the alarm in accordance with the first signal, and in which the second terminal outputs the alarm in accordance with the second signal.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an embodiment of the present disclosure, an area is dynamically set somewhere around a first terminal including a position of the first terminal based on a state of a mobile object on which the first terminal is mounted and the position of the first terminal, and entry or approach of a second terminal to the area is determined. A signal for causing at least one of the first terminal and the second terminal to output an alarm for the entry or the approach is then transmitted to at least one of the first terminal and the second terminal, and at least one of the first terminal and the second terminal outputs the alarm. As a result, since the area is set somewhere around the first terminal in consideration of an element other than a distance to the terminal (mobile object), alarms can be appropriately given to a worker associated with at least one of the first terminal and the second terminal.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment of the present disclosure will be described in detail with reference to the accompanying drawings as appropriate. Having said that, a detailed description more than necessary may be omitted, such as a detailed description of an already well-known matter and a duplicated description for a substantially identical configuration, to avoid the following description becoming unnecessarily redundant and to facilitate understanding by those skilled in the art.

Note that, the accompanying drawings and the following description are provided for those skilled in the art to sufficiently understand the present disclosure, and are not intended to limit the subject matter described in the claims.

Embodiment 1

Figure 1:
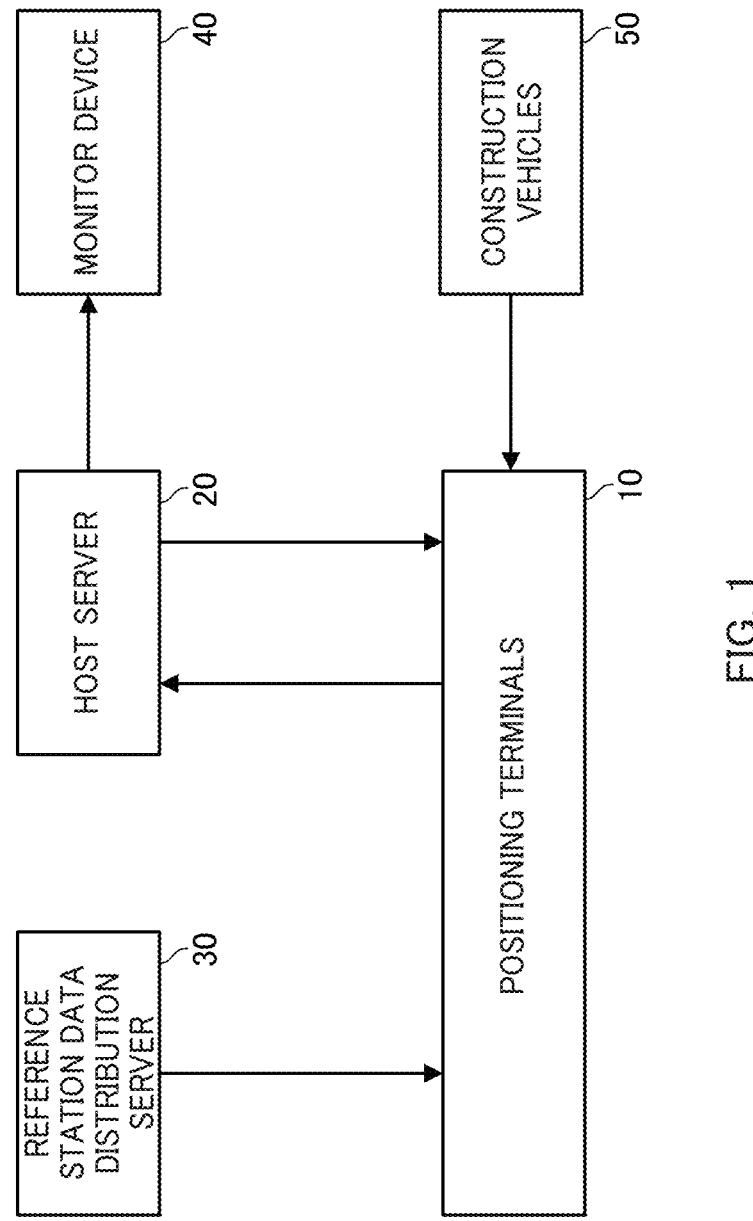
FIG. 1 is a diagram illustrating an example of an alarm system according to Embodiment 1 of the present disclosure.

FIG. 1 is a diagram illustrating an example of alarm system 1 according to Embodiment 1 of the present disclosure. In an example of a scenario where alarm system 1 is used, workers at a work site approach and enter a dangerous area (i.e., a geofence). The dangerous area may also be referred to as a restricted area. Such a scenario will be taken as an example in the following description.

As illustrated in FIG. 1, alarm system 1 includes positioning terminals 10, host server 20, reference station data distribution server 30, monitor device 40, and construction vehicles 50. Alarm system 1 may also be referred to as an information processing system or the like.

When a worker carries positioning terminal 10, positioning terminal 10 (positioning terminal 10A that will be described later) may be, for example, a terminal dedicated to positioning, a wireless terminal such as a mobile phone, a smartphone, a tablet, a wearable device (e.g., includes a wristwatch (or wristband or ring) terminal), a head-mounted display (or glasses or goggles) terminal, an earphone terminal, a clothes terminal, a socks terminal, and the like), or the like. As in a condition illustrated in the drawings, for example, positioning terminal 10 (positioning terminal 10B that will be described later) may be mounted on construction vehicle 50 as, for example, a terminal dedicated to positioning or a wireless terminal having a positioning function, such as a personal computer, a server computer, a smartphone, or a tablet. Positioning terminal 10 may be referred to as an alarm apparatus or the like. Positioning terminal 10 is an example of a first terminal, a second terminal, a terminal, a different (another) terminal, or an information processing apparatus (corresponds to representative positioning terminal 10, which will be described later) in the present disclosure.

There may be a plurality of positioning terminals 10 in alarm system 1. For example, each of two or more of the plurality of positioning terminals 10 may be carried by and associated with one of two or more workers, and each of remaining ones of the plurality of positioning terminals 10 may be mounted on and associated with one of construction vehicles 50.

Positioning terminal 10 may access a network including a mobile communication network using a communication method such as LTE (long-term evolution), 5G Beyond 5G, 6G, Wi-Fi (registered trademark), WiGig (registered trademark), WiMAX (registered trademark), or the like and connect to host server 20 and reference station data distribution server 30 over the network.

Positioning terminal 10 receives radio waves (may also be referred to as a "satellite signal" or a "positioning signal") transmitted from a GNSS (global navigation satellite system) satellite (not illustrated) and generates positioning data regarding positioning terminal 10 (may also be referred to as "positioning terminal positioning data" or "positioning terminal data") using the received satellite signal. Positioning terminal 10 receives, from reference station data distribution server 30, correction data for performing RTK (real-time kinematic) processing and measuring a position thereof (positioning of positioning terminal 10).

Positioning terminal 10 measures the position thereof (also velocity and acceleration thereof depending on the case) by performing RTK processing using the positioning terminal positioning data and the correction data. The position may also be referred to as coordinates (on Earth). The coordinates may be, for example, three-dimensional coordinates including latitude, longitude, and altitude or two-dimensional coordinates represented by two of latitude, longitude, and altitude (e.g., latitude and longitude). It is assumed in the following description that coordinates are two-dimensional coordinates represented by latitude and longitude. An expression "measure a position" may be replaced by "determine a position (or coordinates)", "obtain a position (or coordinates)", "estimate a position (or coordinates)", "detect a position (or coordinates)", "find a position (or coordinates)", "calculate a position (or coordinates)", or "derive a position (or coordinates)", instead. Details of the positioning based on RTK processing will be described later. Accurate positional information or the like can thus be obtained through RTK processing.

When positioning terminal 10 is mounted on construction vehicle 50 (in the case of the condition illustrated in the drawings), positioning terminal 10 obtains state information regarding construction vehicle 50 (information indicating that construction vehicle 50 is traveling forward or backward or is stationary, information indicating a state of an arm included in construction vehicle 50, etc.) from construction vehicle 50 (e.g., a vehicle control system that controls construction vehicle 50).

Positioning terminal 10 transmits a positioning result obtained as a result of the positioning to host server 20. Positioning terminal 10 receives, from host server 20, an alarm output instruction for notifying of occurrence of entry or approach (may be referred to as an "alarm event") of positioning terminal 10 to a dangerous area. The alarm output instruction may be expressed as a signal for causing positioning terminal 10 to output an alarm.

Positioning terminal 10 outputs an alarm for, for example, a worker who is associated therewith or a worker who is driving construction vehicle 50 associated with positioning terminal 10 in accordance with an alarm output instruction.

Host server 20 may be, for example, one or more server computers. Host server 20 may also be referred to as a cloud server. Host server 20 is an example of the information processing apparatus in the present disclosure.

Host server 20 sets dangerous areas. The dangerous areas may include, for example, an area obtained by adding a safety margin to an area where earth and sand are piled up, an area obtained by adding a safety margin to an area where work tools are gathered, an area obtained by adding a safety margin to an area of construction vehicle 50, and the like. Here, the safety margin is a margin defined in consideration of movement and changes in posture (e.g., a fall) of workers. A margin of about 2 m is sufficient considering height of a typical human being, but an operation manager or another person may set any margin in accordance with an actual environment. An area with such a safety margin may be referred to as a dangerous margin area. The dangerous margin area is also an example of the dangerous area. A shape of a dangerous area may be a perfect circle, an oval, a rectangle, or the like, but is not limited to these. In the following description, a shape of a dangerous area is assumed to be a perfect circle, unless otherwise noted.

Host server 20 receives a positioning result transmitted from positioning terminal 10. Host server 20 determines, on the basis of a set dangerous area, a received positioning result, and the like, approach and entry of positioning terminal 10 carried by and associated with a worker to the dangerous area (i.e., detects an alarm event). When detecting an alarm event, host server 20 generates an alarm output instruction for notifying the worker associated with positioning terminal 10 (and a worker who is driving construction vehicle 50 depending on the case) of occurrence of the alarm event and transmits the alarm output instruction to positioning terminal 10.

Host server 20 may manage the plurality of positioning terminals 10 by associating identification information regarding positioning terminals 10 with identification information regarding workers or construction vehicles 50 in a table format or a list format, for example, and storing a table or a list in a storage device included in host server 20.

Host server 20 transmits, to monitor device 40, information such as a set dangerous area, a received positioning result, and positioning terminal 10 to which an alarm output instruction is to be transmitted to display the information.

Reference station data distribution server 30 transmits, to positioning terminal 10, correction data for performing RTK processing and measuring a position of positioning terminal 10. The correction data may be generated by a reference station (not illustrated) and transmitted to reference station data distribution server 30. The reference station may generate positioning data regarding the reference station (may also be referred to as "correction data", "reference station positioning data", or "reference station data") on the basis of a satellite signal transmitted from a GNSS satellite. The reference station may periodically (e.g., a transmission period on the order of seconds or shorter) transmit the generated correction data to reference station data distribution server 30.

Monitor device 40 receives, from host server 20, information such as a dangerous area, a positioning result, and positioning terminal 10 to which an alarm output instruction is to be transmitted. Monitor device 40 displays the information on a display included therein. Monitor device 40 may be included in host server 20 or a computer used by a user such as the operation manager, or may be mounted on construction vehicle 50.

Construction vehicle 50 detects a state thereof on the basis of a vehicle speed pulse, a vehicle forward travel signal and a vehicle backward travel signal based on a shift lever operation performed by a driver, an arm operation signal based on an operation performed by the driver on an arm, and the like and stores state information indicating the detected state in a memory. The state information regarding construction vehicle 50 may include information indicating that construction vehicle 50 is traveling forward, information indicating that construction vehicle 50 is traveling backward, information indicating construction vehicle 50 is turning right, information indicating that construction vehicle 50 is turning left, information indicating that construction vehicle 50 is stationary, and information indicating a state of an arm included in construction vehicle 50, such as information regarding a rotation direction of a tip of the arm, a rotation speed of the tip of the arm, and bending of the arm. Construction vehicle 50 is an example of a mobile object or a different (another) mobile object in the present disclosure. The arm included in construction vehicle 50 is an example of a movable part or a "movable part that is included in a mobile object and that moves without accompanying movement of the mobile object" in the present disclosure.

<Configuration of Positioning Terminal>

Figure 2A:
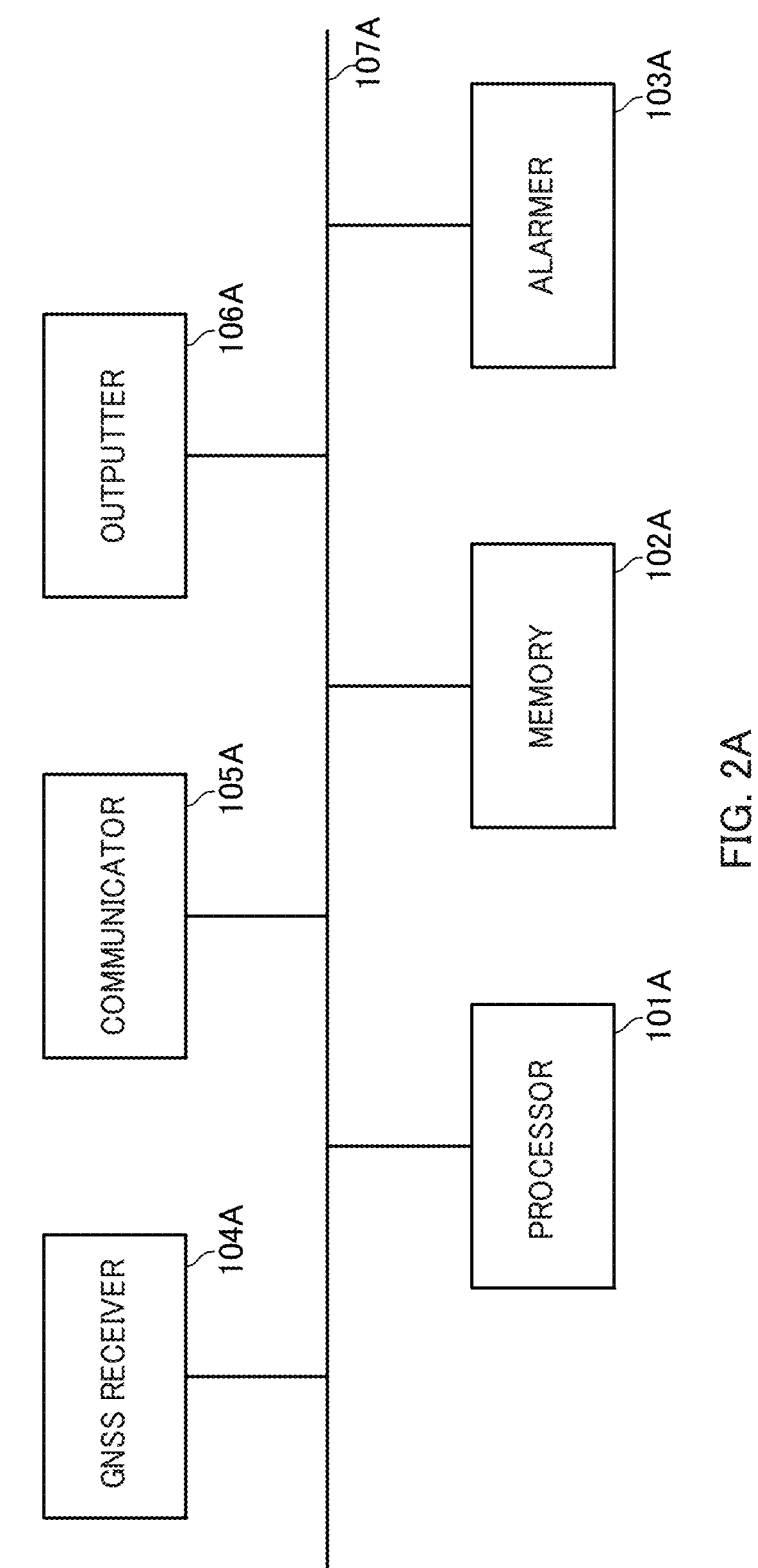
FIG. 2A is a diagram illustrating an example of configuration of a positioning terminal according to Embodiment 1.

FIG. 2A is a block diagram illustrating an example of configuration of positioning terminal 10A according to Embodiment 1. Positioning terminal 10A illustrated in FIG. 2A may be a positioning terminal that is not mounted on construction vehicle 50 but carried by a worker. As illustrated in FIG. 2A, positioning terminal 10A includes processor 101A, memory 102A, alarmer 103A, GNSS receiver 104A, communicator 105A, outputter 106A, and bus 107A.

Processor 101A may be achieved by a processing device such as a central processing unit (CPU). Processor 101A controls overall operation (e.g., the other elements of positioning terminal 10A) of positioning terminal 10A. Processor 101A may also be referred to as a computer, a regulator, a calculator, a controller, or the like.

Processor 101A generates positioning terminal positioning data using a satellite signal from a GNSS satellite. The positioning terminal positioning data may be generated by GNSS receiver 104A and output to processor 101A, instead.

Processor 101A measures (determines) a position, velocity, acceleration, and a travel direction of positioning terminal 10A by performing RTK processing using the positioning terminal positioning data and the correction data from reference station data distribution server 30. When positioning terminal 10A includes a velocity sensor and an acceleration sensor, the velocity sensor and the acceleration sensor may measure the velocity and the acceleration of positioning terminal 10A, respectively, and processor 101A may obtain the velocity and the acceleration from the velocity sensor and the acceleration sensor, respectively, and determine the velocity and the acceleration of positioning terminal 10A. Such measurement may be performed when a satellite signal is received from the GNSS satellite or at certain time intervals such as every 0.2 second, every 0.5 second, or every 1 second. Processor 101A outputs (i.e., stores) a positioning result obtained as a result of positioning to memory 102A. In the present disclosure, a positioning result relating to positioning terminal 10A includes a position (latitude and longitude), velocity, and a travel direction of positioning terminal 10A.

Each time the measurement is performed, processor 101A transmits a positioning result obtained as a result of positioning to host server 20 through communicator 105A.

Processor 101A receives an alarm output instruction from host server 20 through communicator 105A.

Upon receiving the alarm output instruction from host server 20, processor 101A controls alarmer 103A such that alarmer 103A outputs an alarm according to the alarm output instruction. As described later, in an example, an alarm output instruction includes an alarm output instruction for outputting an alarm for entry of positioning terminal 10A into a dangerous area.

Memory 102A may be, for example, one or more of a DRAM (dynamic random-access memory), an HDD (hard disk drive), an SSD (solid-state drive), and the like. Memory 102A obtains various pieces of information from the other elements and temporarily or permanently holds the various pieces of information. Memory 102A is a general term for a so-called primary storage device and a secondary storage device. A plurality of memories 102A may be physically provided, instead.

Memory 102A stores, for example, programs to be executed by processor 101A to operate positioning terminal 10A, data necessary for positioning terminal 10A to operate, data generated by processor 101A, satellite signals transmitted from GNSS satellites, positioning terminal positioning data, correction data transmitted from reference station data distribution server 30, positioning results obtained by processor 101A, alarm output instructions transmitted from host server 20, and the like.

Alarmer 103A outputs an alarm for approach and entry to a dangerous area. Alarmer 103A may output an alarm by, for example, ringing a buzzer, vibrating positioning terminal 10A, outputting an alarm sound through outputter 106A, or any combination of these. Alarmer 103A may output an alarm in a different style in accordance with a predicted time at which positioning terminal 10A will enter a dangerous area.

GNSS receiver 104A receives a satellite signal transmitted from a GNSS satellite. GNSS receiver 104A may generate positioning terminal positioning data regarding positioning terminal 10A using the received satellite signal. GNSS receiver 104A outputs the satellite signal to processor 101A and memory 102A. After generating positioning terminal positioning data, GNSS receiver 104A outputs the positioning terminal positioning data to processor 101A and memory 102A.

Communicator 105A may be achieved, for example, using a communication interface capable of communicating with a communication network such as a cellular communication network. Communicator 105A communicates with external devices through a communication path. The devices with which communicator 105A communicates (communication targets) include, for example, host server 20 and reference station data distribution server 30.

Communicator 105A receives correction data transmitted from reference station data distribution server 30. Communicator 105A receives an alarm output instruction transmitted from host server 20. Communicator 105A outputs the received correction data and alarm output instruction to processor 101A and memory 102A. Communicator 105A transmits a positioning result obtained as a result of positioning to host server 20.

Outputter 106A may be achieved, for example, using an output interface such as a display. In addition, or alternatively, outputter 106A may be achieved using an output interface for sound, vibration, or the like. Outputter 106A presents or provides information for the outside. The information presented or provided by outputter 106A includes a positioning result obtained by processor 101A and the like.

Processor 101A, memory 102A, alarmer 103A, GNSS receiver 104A, communicator 105A, and outputter 106A are communicably connected to one another by bus 107A.

The above configuration of positioning terminal 10A is an example. Some of the components of positioning terminal 10A may be integrated together. Some of the components of positioning terminal 10A may be divided into a plurality of elements. Some of the components of positioning terminal 10A may be omitted. Other elements may be added to positioning terminal 10A. For example, an inputter, which may be a touch display, a keyboard, a mouse, or the like, may be added to positioning terminal 10A.

Figure 2B:
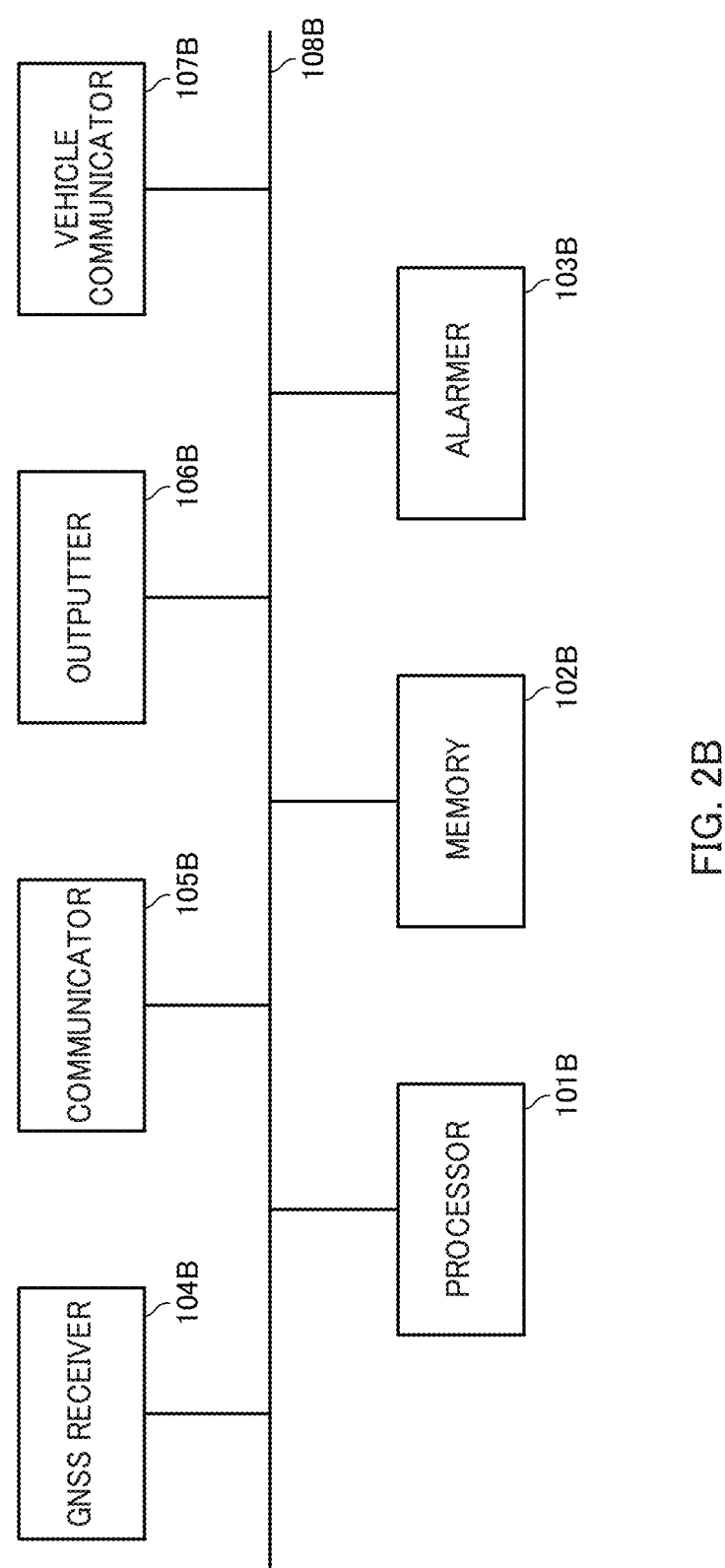
FIG. 2B is a diagram illustrating an example of configuration of another positioning terminal according to Embodiment 1.

FIG. 2B is a block diagram illustrating an example of configuration of positioning terminal 10B according to Embodiment 1. Positioning terminal 10B illustrated in FIG. 2B may be a positioning terminal mounted on construction vehicle 50. As illustrated in FIG. 2B, positioning terminal 10B includes processor 101B, memory 102B, alarmer 103B, GNSS receiver 104B, communicator 105B, outputter 106B, vehicle communicator 107B, and bus 108B. Configuration of processor 101B, memory 102B, alarmer 103B, GNSS receiver 104B, communicator 105B, outputter 106B, vehicle communicator 107B, and bus 108B is the same as that of processor 101A, memory 102A, alarmer 103A, GNSS receiver 104A, communicator 105A, outputter 106A, and bus 107A of positioning terminal 10A, and differences from positioning terminal 10A will be described.

Memory 102B also stores state information regarding construction vehicle 50 obtained by vehicle communicator 107B.

Each time measurement is performed, communicator 105B transmits, to host server 20, a positioning result input from processor 101B and latest state information regarding construction vehicle 50 input from vehicle communicator 107B.

Vehicle communicator 107B obtains state information regarding construction vehicle 50 from (e.g., the vehicle control system of) construction vehicle 50. Vehicle communicator 107B outputs the obtained state information regarding construction vehicle 50 to communicator 105B and memory 102B.

Processor 101B, memory 102B, alarmer 103B, GNSS receiver 104B, communicator 105B, outputter 106B, and vehicle communicator 107B are communicably connected to one another by bus 108B.

The above configuration of positioning terminal 10B is an example. Some of the components of positioning terminal 10B may be integrated together. Some of the components of positioning terminal 10B may be divided into a plurality of elements. Some of the components of positioning terminal 10B may be omitted. Other elements may be added to positioning terminal 10B. For example, an inputter, which may be a touch display, a keyboard, a mouse, or the like, may be added to positioning terminal 10B.

When processor 101A and processor 101B need not be distinguished from each other in the following description, processor 101A and processor 101B might be referred to as processors 101. When alarmer 103A and alarmer 103B need not be distinguished from each other, alarmer 103A and alarm 103B might be referred to as alarmers 103. When communicator 105A and communicator 105B need not be distinguished from each other, communicator 105A and communicator 105B might be referred to as communicators 105.

[Positioning Data]

Next, positioning data will be described. Positioning data includes, for example, pseudo-distance information, carrier phase information, and Doppler frequency information.

The pseudo-distance information is information regarding a distance between a satellite and a receiver (e.g., the reference station or positioning terminal 10). The receiver is capable of calculating a distance to a satellite by analyzing a positioning signal. For example, the receiver obtains time taken for the positioning signal to reach on the basis of the following information.

(1) A difference between a pattern of a code carried by the positioning signal and a pattern (replica) of a code generated by the receiver (2) A time when the satellite generated the signal and a time when the receiver received the signal The time when the satellite generated the signal is included in a message (NAVDATA) of the positioning signal.

The receiver obtains a pseudo-distance between the satellite and the receiver by multiplying the time taken for the positioning signal to reach by the speed of light. The pseudo-distance includes an error caused by a difference between a clock of the satellite and a clock of the receiver and the like. The pseudo-distance information is generated for four or more satellites in order to reduce an error.

The carrier phase information is a phase of the positioning signal received by the receiver. The positioning signal is a certain sine wave. The receiver can calculate a phase of the positioning signal by analyzing the received positioning signal.

The Doppler frequency information is information regarding relative speeds of the satellite and the receiver. The receiver can generate the Doppler frequency information by analyzing the positioning signal.

[RTK Processing]

Next, RTK processing will be described. RTK processing is processing where RTK, which is one of interference positioning methods, is performed.

RTK is a positioning method where a position of a certain point is measured using a carrier phase integrated value of a positioning signal transmitted from a satellite. The carrier phase integrated value is the sum of (1) the number of waves of the positioning signal and (2) phases from the satellite to the certain point.

Once the carrier phase integrated value is obtained, a distance between the satellite and the certain point can be obtained since frequency (and wavelength) of the positioning signal is known. Because the number of waves of the positioning signal is an unknown value, the number of waves of the positioning signal is called integer ambiguity or an integer bias.

In RTK, noise reduction and estimation (or determination) of integer ambiguity are performed.

In RTK, for example, noise can be reduced by calculating a difference called a double difference. The double difference is a difference between values of differences (single differences), calculated by two receivers (e.g., the reference station and positioning terminal 10), in the carrier phase integrated value in relation to two satellites. Because four or more satellites are used in positioning based on RTK, the same number of double differences as the number of combinations of the four or more satellites is calculated. Reference station positioning data generated by the reference station and positioning terminal positioning data generated by positioning terminal 10, for example, are used for the calculation of double differences.

In RTK, various methods can be used to estimate the integer ambiguity. The integer ambiguity is estimated by performing a procedure of, for example, (1) estimation of a float solution in a least squares method and (2) verification of a fixed solution based on the float solution.

The estimation of a float solution in the least squares method is performed by creating simultaneous equations using a combination of double differences generated for each time unit and solving the created simultaneous equations using the least squares method. In this processing, for example, reference station positioning data generated by the reference station, positioning terminal positioning data generated by positioning terminal 10, and known coordinates of the reference station are used. A real estimate of the integer ambiguity estimated in this manner is called a float solution (estimated solution).

Whereas the float solution obtained as described above is a real number, a true value of the integer ambiguity is an integer. The float solution, therefore, is converted into an integer through "rounding". Here, there can be a plurality of candidates for a combination for rounding the float solution.

A correct integer is verified among the plurality of candidates. A solution found, as a result of the verification, to be probable as an integer bias is called a fixed solution (accurate positioning solution). In an example, a quality check is performed using an AR (ambiguity ratio) value obtained as a result of the RTK processing, and a correct integer is verified on the basis of a result of the quality check. In order to efficiently narrow down candidates for an integer, reference station positioning data generated by the reference station may be used.

[Positioning Terminal Position Measurement (Determination) Based on RTK Processing]

Next, measurement (determination) of a position (coordinates on Earth) of positioning terminal 10 (positioning terminal 10A or 10B) performed by processor 101 of positioning terminal 10 will be described.

Processor 101 performs interference positioning based on RTK (RTK processing) using, for example, positioning terminal positioning data from positioning terminal 10 and reference station positioning data from the reference station (i.e., correction data transmitted from reference station data distribution server 30), and calculates a positioning solution (a fixed solution or a float solution). A positioning solution obtained through RTK processing may also be referred to as an "RTK positioning solution".

Processor 101 performs a quality check using an AR value obtained through RTK processing. When the AR value is larger than or equal to a certain threshold (e.g., 3.0), processor 101 determines that a correct fixed solution has been obtained, and outputs the fixed solution. When the AR value is smaller than the certain threshold, processor 101 determines that a correct positioning solution has not been obtained, and outputs a float solution.

Processor 101 then determines the RTK positioning solution as the position (coordinates on Earth) of positioning terminal 10.

<Configuration of Host Server>

Figure 3:
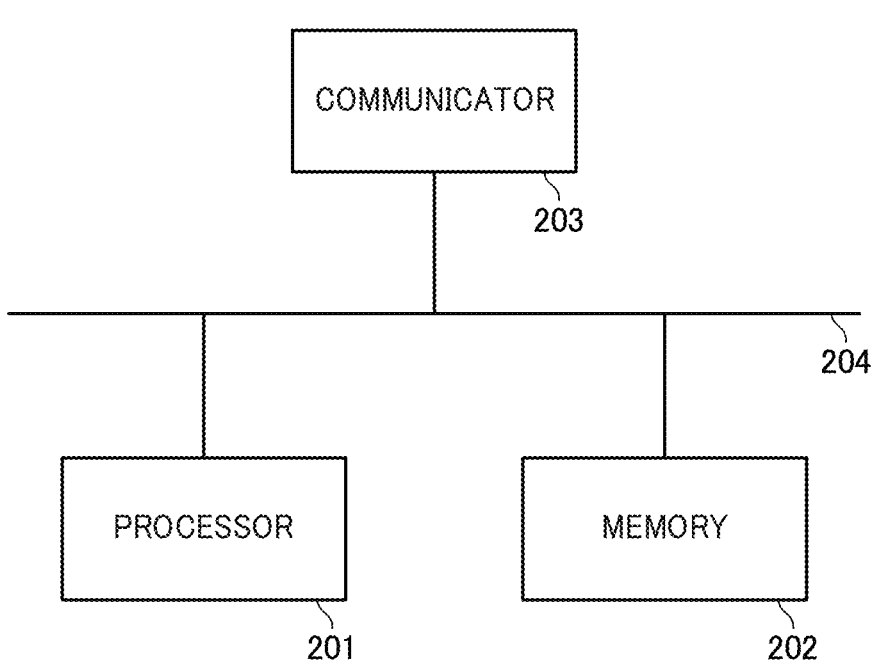
FIG. 3 is a diagram illustrating an example of configuration of a host server according to Embodiment 1.

FIG. 3 is a block diagram illustrating an example of configuration of host server 20 according to Embodiment 1. As illustrated in FIG. 3, host server 20 includes processor 201, memory 202, communicator 203, and bus 204.

Processor 201 may be achieved by a processing device such as a CPU. Processor 201 controls overall operation of host server 20 (e.g., the other elements of host server 20). Processor 201 may also be referred to as a computer, a regulator, a calculator, a controller, or the like.

Processor 201 sets dangerous areas. When a dangerous area does not relate to an area of construction vehicle 50, for example, processor 201 may statically (permanently) or semi-statically set the dangerous area, which may or may not include a safety margin, on the basis of area information (e.g., positional information regarding a virtual boundary line) input by a user, such as the operation manager, through an inputter (not illustrated). When a dangerous area relates to an area of construction vehicle 50, on the other hand, processor 201 may dynamically and automatically set a new dangerous area on the basis of a positioning result of positioning terminal 10B and a state (information) of construction vehicle 50 from positioning terminal 10B associated with construction vehicle 50. Processor 201 may generate information indicating that construction vehicle 50 is traveling forward, information indicating that construction vehicle 50 is traveling backward, information indicating construction vehicle 50 is turning right, information indicating that construction vehicle 50 is turning left, and information indicating that construction vehicle 50 is stationary in the state information regarding construction vehicle 50 also on the basis of the received positioning result (e.g., a position and velocity) of positioning terminal 10B. An example of the setting of a new dangerous area will be described later. A new dangerous area includes a position of positioning terminal 10B associated with construction vehicle 50 and is set somewhere around positioning terminal 10B.

Processor 201 may set one threshold or a plurality of stepwise thresholds for determining approach of positioning terminal 10A to a dangerous area. The one or plurality of thresholds may be referred to as predicted entry time thresholds. That is, the predicted entry time thresholds are thresholds to be compared with a predicted time at which positioning terminal 10A will enter a dangerous area, which will be described later. When a distance between positioning terminal 10A and the center of a dangerous area is larger than or equal to a certain distance, processor 201 determines that positioning terminal 10A will not output an alarm. Processor 201 may set the certain distance as a threshold. The threshold may be referred to as a non-alarm distance threshold. For example, processor 201 may set a threshold input by a user, such as the operation manager, through an inputter as the predicted entry time threshold or the non-alarm distance threshold. Processor 201 outputs the predicted entry time threshold and the non-alarm distance threshold to memory 202.

Each time a positioning result is received from positioning terminal 10A associated with a worker, for example, processor 201 predicts a time of entry of positioning terminal 10A into a set dangerous area (i.e., a predicted time at which positioning terminal 10A will reach the dangerous area) on the basis of the positioning result and the dangerous area. The expression "predict a time of entry" may be replaced by "estimate a time of entry", "guess a time of entry", "determine a (predicted) time of entry", "obtain a (predicted) time of entry", "find a (predicted) time of entry", "calculate a (predicted) time of entry", or "derive a (predicted) time of entry".

Each time a positioning result is received from positioning terminal 10A associated with a worker, for example, processor 201 determines approach and entry of positioning terminal 10A to a set dangerous area (detects an alarm event) on the basis of at least the positioning result, the predicted entry time threshold, the non-alarm distance threshold, or the dangerous area.

Processor 201 generates an alarm output instruction for notifying a worker associated with positioning terminal 10A (and a worker who is driving construction vehicle 50 depending on the case) of occurrence of the detected alarm event. Processor 201 outputs the alarm output instruction to memory 202. Processor 201 transmits the alarm output instruction to positioning terminal 10A through communicator 203.

Each time a positioning result is received from positioning terminal 10A associated with a worker or construction vehicle 50, for example, processor 201 transmits information such as a set dangerous area, the received positioning result, and positioning terminal 10A to which an alarm output instruction is to be transmitted to monitor device 40 through communicator 203 to display the information.

Memory 202 may be, for example, one or more of a DRAM, an HDD, an SSD, and the like. Memory 202 obtains various pieces of information from the other elements and temporarily or permanently holds the various pieces of information. Memory 202 is a general term for a so-called primary storage device and a secondary storage device. A plurality of memories 202 may be physically provided, instead.

Memory 202 stores, for example, programs to be executed by processor 201 to operate host server 20, data necessary for host server 20 to operate, data generated by processor 201, positioning results transmitted from positioning terminals 10, state information regarding construction vehicles 50 transmitted from positioning terminals 10B, the predicted entry time threshold, and the non-alarm distance threshold, information regarding set dangerous areas, generated alarm output instructions, and the like.

Communicator 203 receives a positioning result transmitted from positioning terminal 10. Communicator 203 receives state information regarding construction vehicle 50 transmitted from positioning terminal 10B. Communicator 203 outputs the received positioning result and state information regarding construction vehicle 50 to processor 201 and memory 202. Communicator 203 transmits alarm output instructions to positioning terminals 10.

Processor 201, memory 202, and communicator 203 are communicably connected to one another by bus 204.

The above configuration of host server 20 is an example. Some of the components of host server 20 may be integrated together. Some of the components of host server 20 may be divided into a plurality of elements. Some of the components of host server 20 may be omitted. Other elements may be added to host server 20. For example, an inputter, which may be a touch display, a keyboard, a mouse, or the like, may be added to host server 20.

[Generation and Setting of New Dangerous Area]

Next, dynamic generation and setting of a new dangerous area based on a positioning result of positioning terminal 10B and a state (information) of construction vehicle 50 on which positioning terminal 10B is mounted will be described.

Figure 12A:
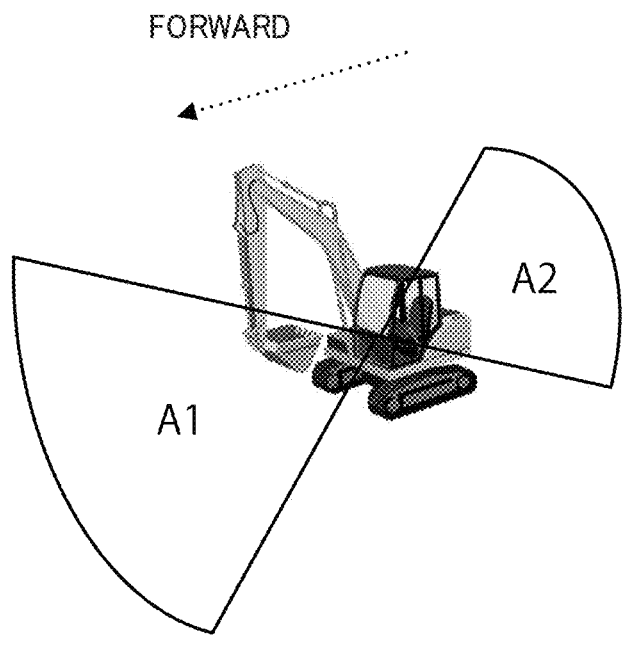
FIG. 12A is a diagram illustrating an example of a new dangerous area at a time when a construction vehicle is traveling forward according to an embodiment of the present disclosure.

First, dynamic generation and setting of a new dangerous area when construction vehicle 50 is traveling forward will be described. When construction vehicle 50 is traveling forward, a worker ahead of construction vehicle 50 is more likely to be exposed to danger than a worker behind construction vehicle 50. In this case, therefore, processor 201 generates, ahead of construction vehicle 50, a fan having a first radius centered on a position of positioning terminal 10B included in a positioning result and a central angle of a first angle (e.g., 45 degrees) symmetrically extending from an axis representing a travel direction of construction vehicle 50 as a part of a new dangerous area. Processor 201 also generates, behind construction vehicle 50, a fan having a second radius, which is shorter than the first radius, centered on the position of positioning terminal 10B included in the positioning result and a central angle of a second angle, which is smaller than or equal to the first angle (e.g., 45 degrees), symmetrically extending from the axis representing the travel direction of construction vehicle 50 as another part of the new dangerous area. Processor 201 then generates an area obtained by combining together these parts of the new dangerous area as the new dangerous area. In other words, when construction vehicle 50 is traveling forward, processor 201 generates and sets a new dangerous area including a first part ahead of construction vehicle 50 and a second part behind construction vehicle 50, the second part being smaller than the first part. The first radius, the second radius, the first angle, and the second angle may be input and set by a user, such as the operation manager, through an inputter, or may be fixed in alarm system 1. The second radius may be as long as the first radius, instead. The second radius of the fan generated behind construction vehicle 50 may be shortened stepwise from the first radius. FIG. 12A illustrates an example of a new dangerous area at a time when construction vehicle 50 is traveling forward according to an embodiment of the present disclosure. Here, the new dangerous area includes first part A1 and second part A2 (radius of fan A1>radius of fan A2).

Figure 12B:
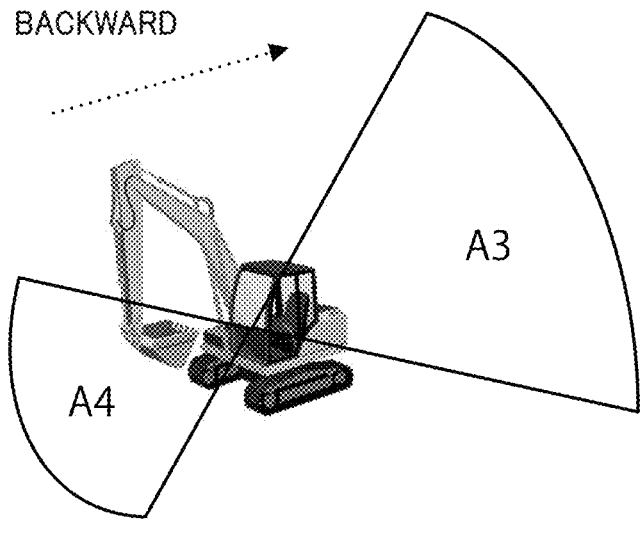
FIG. 12B is a diagram illustrating an example of a new dangerous area at a time when the construction vehicle is traveling backward according to the embodiment of the present disclosure.

Secondly, dynamic generation and setting of a new dangerous area when construction vehicle 50 is traveling backward will be described. When construction vehicle 50 is traveling backward, a worker behind construction vehicle 50 is more likely to be exposed to danger than a worker ahead of construction vehicle 50. In this case, therefore, processor 201 generates, behind construction vehicle 50, a fan having the first radius centered on a position of positioning terminal 10B included in a positioning result and a central angle of the first angle (e.g., 45 degrees) symmetrically extending from the axis representing the travel direction of construction vehicle 50 as a part of a new dangerous area. Processor 201 also generates, ahead of construction vehicle 50, a fan having the second radius, which is shorter than the first radius, centered on the position of positioning terminal 10B included in the positioning result and a central angle of the second angle, which is smaller than or equal to the first angle (e.g., 45 degrees), symmetrically extending from the axis representing the travel direction of construction vehicle 50 as another part of the new dangerous area. Processor 201 then generates an area obtained by combining together these parts of the new dangerous area as the new dangerous area. In other words, when construction vehicle 50 is traveling backward, processor 201 generates and sets a new dangerous area including a third part behind construction vehicle 50 and a fourth part ahead of construction vehicle 50, the fourth part being smaller than the third part. The first radius, the second radius, the first angle, and the second angle may be input and set by a user, such as the operation manager, through an inputter, or may be fixed in alarm system 1. The second radius may be as long as the first radius, instead. The second radius of the fan generated ahead of construction vehicle 50 may be shortened stepwise from the first radius. FIG. 12B illustrates an example of a new dangerous area at a time when construction vehicle 50 is traveling backward according to the embodiment of the present disclosure. Here, the new dangerous area includes third part A3 and fourth part A4 (radius of fan A3>radius of fan A4).

Figure 13A:
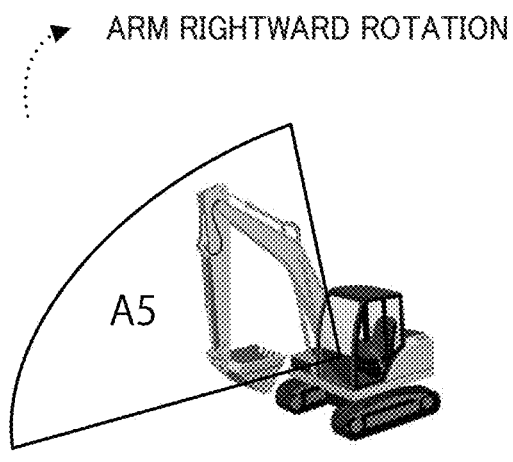
FIG. 13A is a diagram illustrating an example of a new dangerous area at a time when a tip of an arm of the construction vehicle is rotating rightward relative to a forward direction of the construction vehicle according to the embodiment of the present disclosure.

Thirdly, dynamic generation and setting of a new dangerous area when a tip of an arm of construction vehicle 50 is rotating rightward relative to a forward direction of construction vehicle 50 will be described. When the tip of the arm of construction vehicle 50 is rotating rightward relative to the front direction of construction vehicle 50, a worker to the right of construction vehicle 50 relative to the forward direction can be exposed to danger. In this case, therefore, processor 201 generates and sets a fan having a certain radius centered on a position of positioning terminal 10B included in a positioning result and a central angle of a certain angle (e.g., 120 degrees) extending to the right relative to the forward direction of construction vehicle 50 from the axis representing the travel direction of construction vehicle 50 as a new dangerous area. In other words, when the tip of the arm of construction vehicle 50 is rotating rightward relative to the forward direction of construction vehicle 50, processor 201 generates and sets a new dangerous area to the right of construction vehicle 50 relative to the forward direction. Processor 201 may adjust length of the radius in accordance with at least rotational speed of the tip of the arm or bending of the arm (i.e., reach of the tip of the arm). For example, processor 201 may adjust the length of the radius such that the radius becomes longer as the rotational speed of the tip of the arm increases and the radius becomes shorter as the arm bends more deeply (i.e., as the reach of the tip of the arm decreases). In other words, processor 201 may adjust size of the new dangerous area by adjusting the length of the radius in accordance with at least the rotational speed of the tip of the arm or the reach of the tip of the arm. Alternatively, the radius may be input and set by a user, such as the operation manager, through an inputter, or may be fixed in alarm system 1. The certain angle may be input and set by a user, such as the operation manager, through an inputter, or may be fixed in alarm system 1. FIG. 13A illustrates an example of new dangerous area A5 at a time when the tip of the arm of construction vehicle 50 is rotating rightward relative to the forward direction of construction vehicle 50 according to the embodiment of the present disclosure.

Figure 13B:
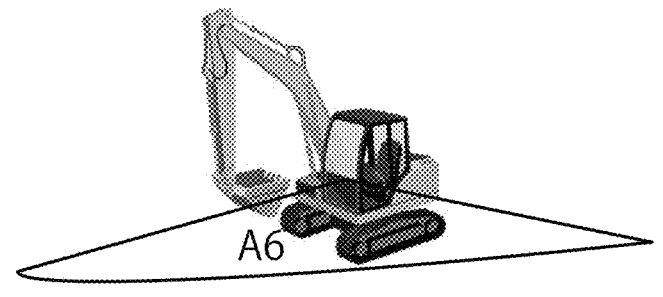
FIG. 13B is a diagram illustrating an example of a new dangerous area at a time when the tip of the arm of the construction vehicle is rotating leftward relative to the forward direction of the construction vehicle according to the embodiment of the present disclosure.

Fourthly, dynamic generation and setting of a new dangerous area when the tip of the arm of construction vehicle 50 is rotating leftward relative to the forward direction of construction vehicle 50 will be described. When the tip of the arm of construction vehicle 50 is rotating leftward relative to the front direction of construction vehicle 50, a worker to the left of construction vehicle 50 relative to the forward direction can be exposed to danger. In this case, therefore, processor 201 generates and sets a fan having the certain radius centered on a position of positioning terminal 10B included in a positioning result and a central angle of the certain angle (e.g., 120 degrees) extending to the left relative to the forward direction of construction vehicle 50 from the axis representing the travel direction of construction vehicle 50 as a new dangerous area. In other words, when the tip of the arm of construction vehicle 50 is rotating leftward relative to the forward direction of construction vehicle 50, processor 201 generates and sets a new dangerous area to the right of construction vehicle 50 relative to the forward direction. Processor 201 may adjust the length of the radius in accordance with at least the rotational speed of the tip of the arm or the bending of the arm (i.e., the reach of the tip of the arm). For example, processor 201 may adjust the length of the radius such that the radius becomes longer as the rotational speed of the tip of the arm increases and the radius becomes shorter as the arm bends more deeply (i.e., as the reach of the tip of the arm decreases). In other words, processor 201 may adjust size of the new dangerous area by adjusting the length of the radius in accordance with at least the rotational speed of the tip of the arm or the reach of the tip of the arm. Alternatively, the radius may be input and set by a user, such as the operation manager, through an inputter, or may be fixed in alarm system 1. The certain angle may be input and set by a user, such as the operation manager, through an inputter, or may be fixed in alarm system 1. FIG. 13B illustrates an example of new dangerous area A6 at a time when the tip of the arm of construction vehicle 50 is rotating leftward relative to the forward direction of construction vehicle 50 according to the embodiment of the present disclosure.

The above-described new dangerous area is set somewhere around positioning terminal 10 including a position of positioning terminal 10. That is, in consideration of a state of construction vehicle 50, a high-risk part around positioning terminal 10 is set as a new dangerous area, and a remaining part around positioning terminal 10 where risk is not high is not set as a new dangerous area. By setting a high-risk part as a new dangerous area and not setting a remaining part where risk is not high as a new dangerous area, safety can be ensured while suppressing excessive output of alarms.

[Determination of Approach to Dangerous Area]

Next, a determination whether positioning terminal 10A is approaching a dangerous area will be determined. In the following description, a dangerous area may be replaced as appropriate by a new dangerous area set on the basis of a state of positioning terminal 10B.

As described above, processor 201 may set a plurality of stepwise predicted entry time thresholds (e.g., unit: seconds) and a non-alarm distance threshold (e.g., unit: meters). Although an example where the number of the plurality of predicted entry time thresholds is two will be described hereinafter, it is obvious that the number of the plurality of predicted entry time thresholds may be three or more. Alternatively, one predicted entry time threshold may be used instead of using the plurality of predicted entry time thresholds. In the following description, two predicted entry times are defined as a first predicted entry time threshold and a second predicted entry time threshold, and the first predicted entry time threshold<the second predicted entry time threshold.

When a position (latitude and longitude) of positioning terminal 10A is outside a set dangerous area (a circle or fan), processor 201 calculates distance 1 (e.g., unit: meters) from the position of positioning terminal 10A to a point closest to positioning terminal 10A at which a straight line connecting the position of positioning terminal 10A and the center (coordinates) of the dangerous area intersects with a boundary line (a circumference or an arc) of the dangerous area.

When the non-alarm distance threshold≤distance 1, processor 201 does not generate an alarm output instruction.

When distance 1≤the non-alarm distance threshold and a predicted entry time<the first predicted entry time threshold, processor 201 detects an alarm event as a first approach state.

When distance 1<the non-alarm distance threshold and the first predicted entry time threshold≤the predicted entry time<the second predicted entry time threshold, processor 201 detects an alarm event as a second approach state.

The first approach state is a state in which it is predicted that positioning terminal 10A will reach a dangerous area earlier than in the second approach state.

In the above-described conditions, "≤" may be replaced by "<" as appropriate, and "<" may be replaced by "≤" as appropriate.

When the number of the plurality of predicted entry time thresholds is n (n: an integer larger than or equal to 3), too, processor 201 can detect an alarm event as a k-th approach state (k=1, 2, . . . , n) as in the above description.

By setting the non-alarm distance threshold, an alarm is thus not output when a distance between the center of a dangerous area and a position of positioning terminal 10A is larger than or equal to the non-alarm distance threshold (or exceeds the non-alarm distance threshold), and excessive output of alarms can be suppressed.

[Generation of Alarm Output Instruction]

Next, generation of an alarm output instruction will be described.

First, generation of an alarm output instruction when positioning terminal 10A is located within a dangerous area will be described. In the following description, a dangerous area may be replaced as appropriate by a new dangerous area set on the basis of a state of positioning terminal 10B.

When a position (latitude and longitude) of positioning terminal 10A is inside a set dangerous area, processor 201 calculates distance L (e.g., unit: meters) between the position of positioning terminal 10A and the center (coordinates) of the dangerous area. Processor 201 determines a style of an entry alarm according to the calculated distance. When radius of the dangerous area (a circle or fan) is denoted by r (e.g., unit: meters), for example, at least volume or a beep period of a buzzer output by alarmer 103 of positioning terminal 10A may be changed depending on whether $0<L\le r/4$ (an alarm event that is a first entry state), $r/4<L\le r/2$ (an alarm event that is a second entry state), $r/2<L\le 3r/4$ (an alarm event that is a third entry state), or $3r/4<L\le r$ (an alarm event that is a fourth entry state). In other words, the volume of the buzzer may be increased and/or the beep period of the buzzer may be shortened as positioning terminal 10A becomes closer to the center of the dangerous area. That is, intensity of an alarm may be increased as positioning terminal 10 becomes closer to the center of a dangerous area.

Alternatively, a reference different from radius r of a dangerous area may be used. For example, the volume or the beep period of the buzzer output from alarmer 103 of positioning terminal 10A may be changed in accordance with whether $0<L\le 0.5$ m (an alarm event that is the first entry state), $0.5$ m$<L\le 0.8$ m (an alarm event that is the second entry state), $0.8$ m$<L\le 0.9$ m (an alarm event that is the third entry state), or $0.9$ m$<L\le r$ (an alarm event that is the fourth entry state). In this case, too, the volume of the buzzer may be increased and/or the beep period of the buzzer may be shortened as positioning terminal 10A becomes closer to the center of the dangerous area. That is, intensity of an alarm may be increased as positioning terminal 10 becomes closer to the center of a dangerous area.

When a dangerous area relates an area of construction vehicle 50, processor 201 may change a style or a pattern of the entry alarm between the original dangerous area (or a statically (permanently) or semi-statically set dangerous area) and a new dangerous area set on the basis of a state of construction vehicle 50. For example, a pattern of an alarm sound of an alarm for entry into the new dangerous area may be different from a pattern of an alarm sound of an alarm for entry into the original dangerous area. Alternatively, a pattern of the alarm for entry into the new dangerous area may be different from a pattern of the alarm for entry into the original dangerous area by several seconds. By doing so, it becomes possible to prevent a worker associated with positioning terminal 10A from panicking at a sudden alarm when the worker unintendedly enters a new dangerous area (e.g., a part extended from an original dangerous area) even though he/she has not moved.

In the above-described conditions, "$\le$" may be replaced by "$<$" as appropriate, and "$<$" may be replaced by "$\le$" as appropriate.

Although an example where four levels of alarms are given has been described above, two or three levels, or five or more levels, of alarms may be given, instead. Conditions for defining a plurality of levels are not limited to the above example.

Processor 201 then generates an alarm output instruction for the entry alarm in a determined style.

Secondly, generation of an alarm output instruction when positioning terminal 10A is located outside a dangerous area will be described.

When positioning terminal 10A is in the above-described first approach state, processor 201 generates an alarm output instruction corresponding to the first approach state (the alarm may be referred to as a first cautionary alarm). A style of the first cautionary alarm corresponding to the first approach state may be different from the style of the entry alarm described above. For example, the first cautionary alarm corresponding to the first approach state may have a volume even smaller than that of the buzzer in the above-described style and/or the buzzer may be output just once or twice.

When positioning terminal 10A is in the above-described second approach state, processor 201 generates an alarm output instruction corresponding to the second approach state (the alarm may be referred to as a second cautionary alarm). A style of the second cautionary alarm corresponding to the second approach state may be different from the style of the entry alarm and the style of the first cautionary alarm described above. For example, the second cautionary alarm corresponding to the second approach state may have a volume even smaller than that of the buzzer of the first cautionary alarm and/or the buzzer may be output even fewer times than the number of times that the buzzer of the first cautionary alarm is output.

Processor 201 thus generates alarm output instructions for outputting alarms for entry and approach of positioning terminal 10A to a dangerous area, and communicator 203 transmits these alarm output instructions to positioning terminal 10A.

Processor 201 generates different alarm output instructions for different predicted times at which positioning terminal 10A will enter a dangerous area so that alarms in different styles will be output for the different predicted times, and communicator 203 transmits these alarm output instructions to positioning terminal 10A.

By setting the plurality of stepwise predicted entry time thresholds, alarms are thus output stepwise in accordance with predicted entry times, and entry of positioning terminal 10A into a dangerous area can be efficiently prevented.

By changing behavior of an alarm inside and outside a dangerous area, a worker can be effectively urged to exit the dangerous area.

The style may be replaced by modes.

<Operation of Alarm System>

Next, an example of operation of alarm system 1 according to Embodiment 1 will be described with reference to FIGS. 4A, 4B, 5, 6A, and 6B.

[Operation of Positioning Terminal]

Figure 4A:
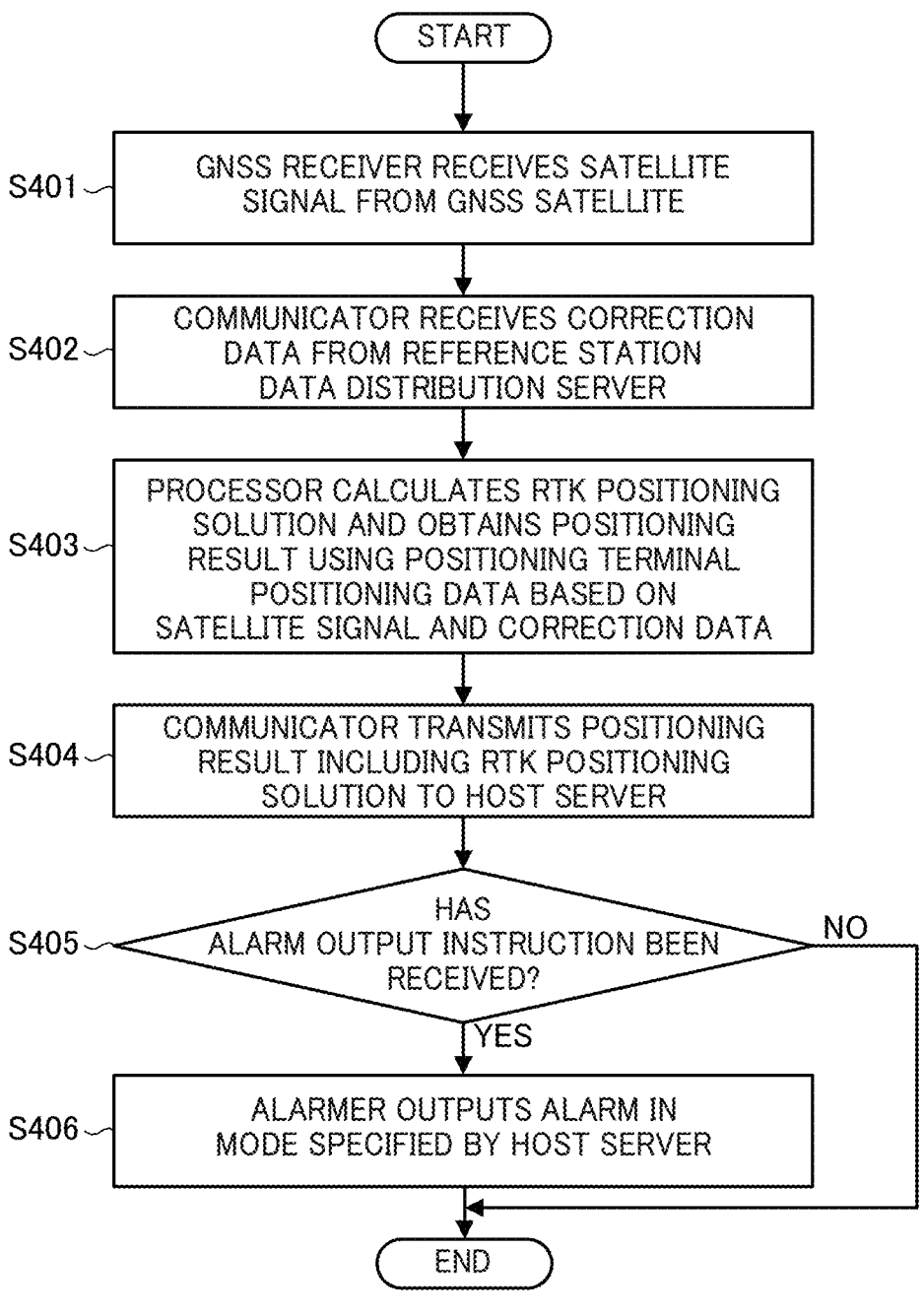
FIG. 4A is a diagram illustrating an example of operation of the positioning terminal according to Embodiment 1.

FIG. 4A is a diagram illustrating an example of operation of positioning terminal 10A according to Embodiment 1.

In step S401, GNSS receiver 104A receives a satellite signal transmitted from a GNSS satellite.

In step S402, communicator 105A receives correction data transmitted from reference station data distribution server 30.

In step S403, processor 101A performs RTK processing using positioning terminal positioning data based on the satellite signal and the correction data to calculate an RTK positioning solution and obtain a positioning result.

In step S404, communicator 105A transmits the positioning result including the RTK positioning solution to host server 20.

In step S405, processor 101A or communicator 105A determines whether communicator 105A has received an alarm output instruction (e.g., within a certain period of time since the transmission of the positioning result).

When communicator 105A has received an alarm output instruction (e.g., within the certain period of time since the transmission of the positioning result) (YES in step S405), alarmer 103A outputs, in step S406, an alarm in a style specified (determined) by host server 20. The flow then ends.

When communicator 105A has not received an alarm output instruction (e.g., within the certain period of time since the transmission of the positioning result) (NO in step S405), on the other hand, the flow ends.

The process in FIG. 4A is then repeated.

Figure 4B:
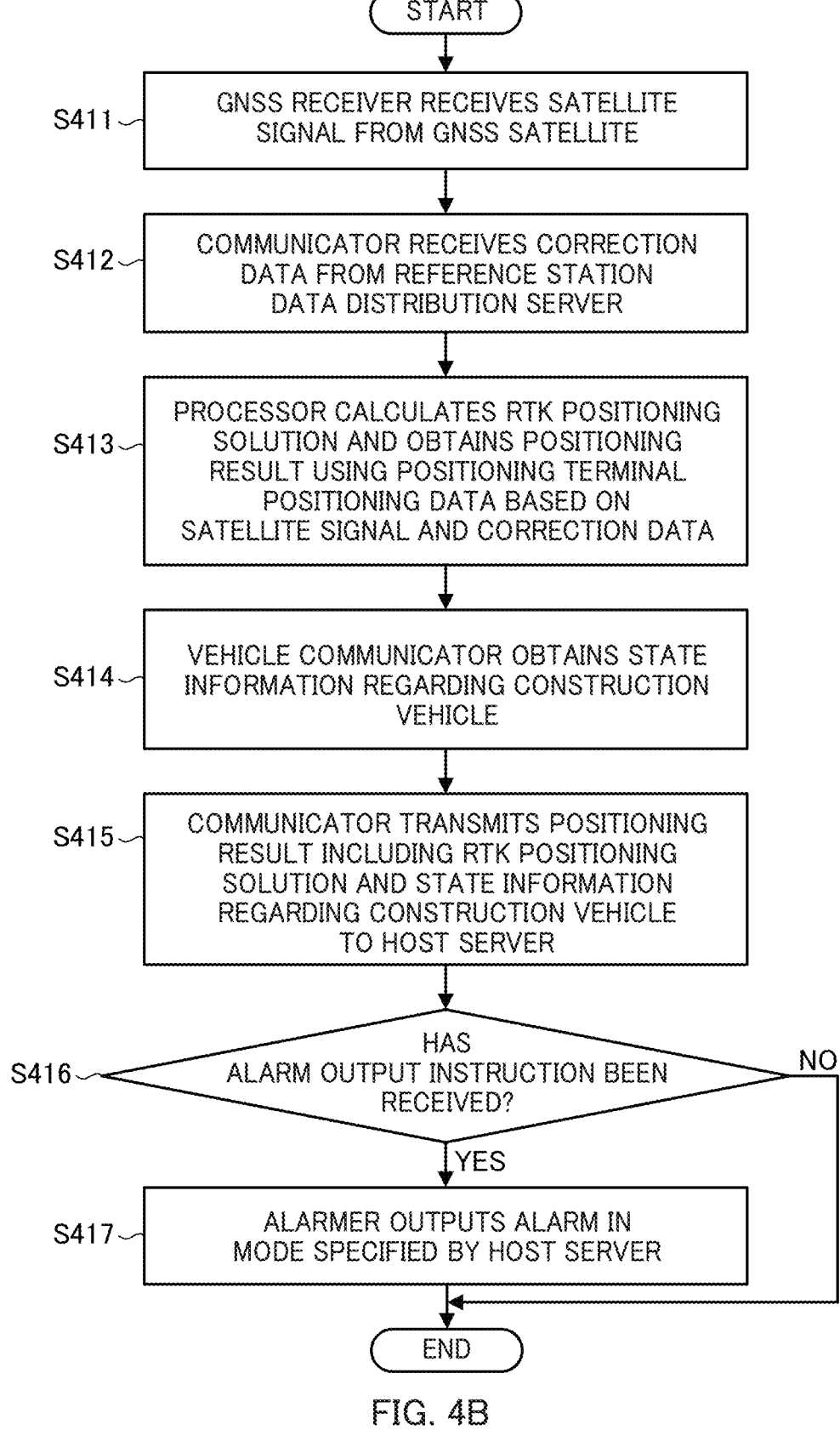
FIG. 4B is a diagram illustrating an example of operation of the other positioning terminal according to Embodiment 1.

FIG. 4B is a diagram illustrating an example of operation of positioning terminal 10B according to Embodiment 1.

In step S411, GNSS receiver 104B receives a satellite signal transmitted from a GNSS satellite.

In step S412, communicator 105B receives correction data transmitted from reference station data distribution server 30.

In step S413, processor 101B performs RTK processing using positioning terminal positioning data based on the satellite signal and the correction data to calculate an RTK positioning solution and obtain a positioning result.

In step S414, vehicle communicator 107B obtains state information regarding construction vehicle 50 from (e.g., the vehicle control system of) construction vehicle 50.

In step S415, communicator 105B transmits the positioning result including the RTK positioning solution and the state information regarding construction vehicle 50 to host server 20.

In step S416, processor 101B or communicator 105B determines whether communicator 105B has received an alarm output instruction (e.g., within a certain period of time since the transmission of the positioning result).

When communicator 105B has received an alarm output instruction (e.g., within the certain period of time since the transmission of the positioning result) (YES in step S416), alarmer 103B outputs, in step S417, an alarm in a style specified (determined) by host server 20. The flow then ends.

When communicator 105B has not received an alarm output instruction (e.g., within the certain period of time since the transmission of the positioning result) (NO in step S416), on the other hand, the flow ends.

The process in FIG. 4B is then repeated.

[Operation of Host Server]

Figure 5:
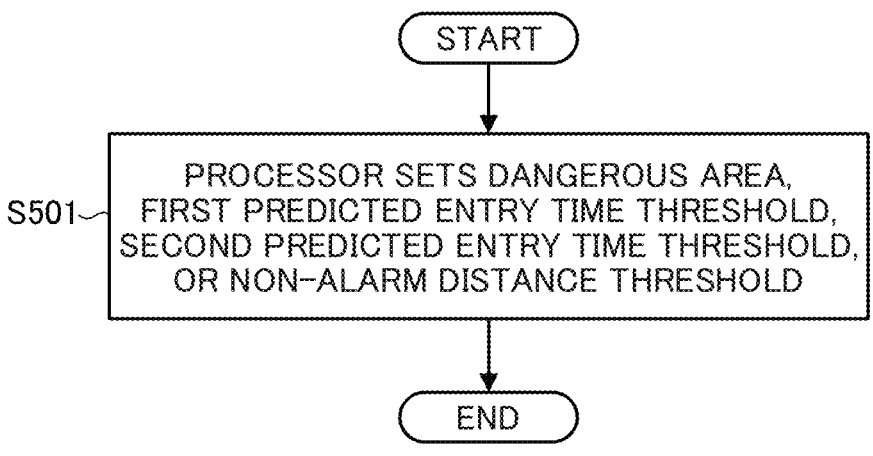
FIG. 5 is a diagram illustrating an example of operation of the host server according to Embodiment 1.
Figure 6A:
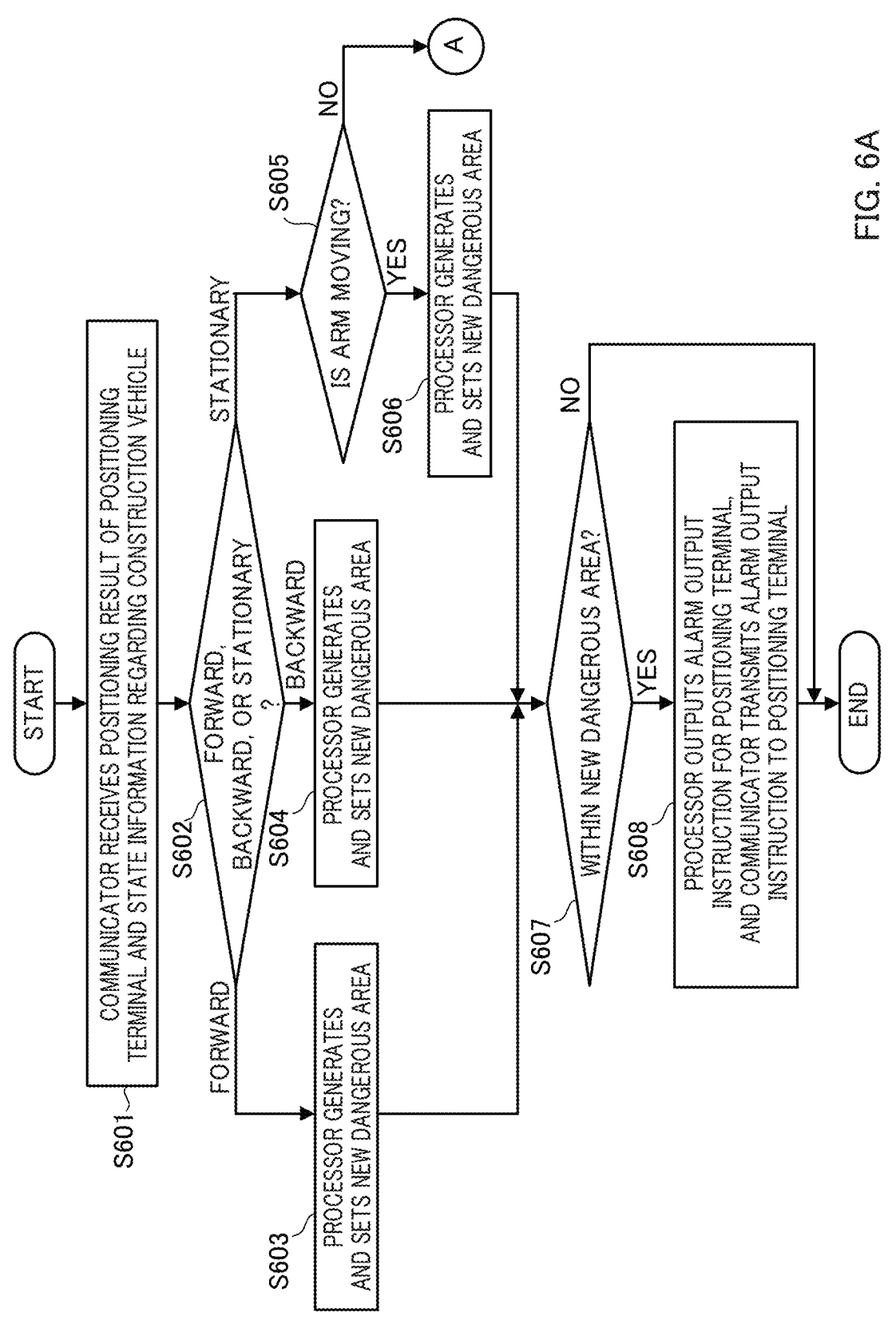
FIG. 6A is a diagram illustrating another example of the operation of the host server according to Embodiment 1.
Figure 6B:
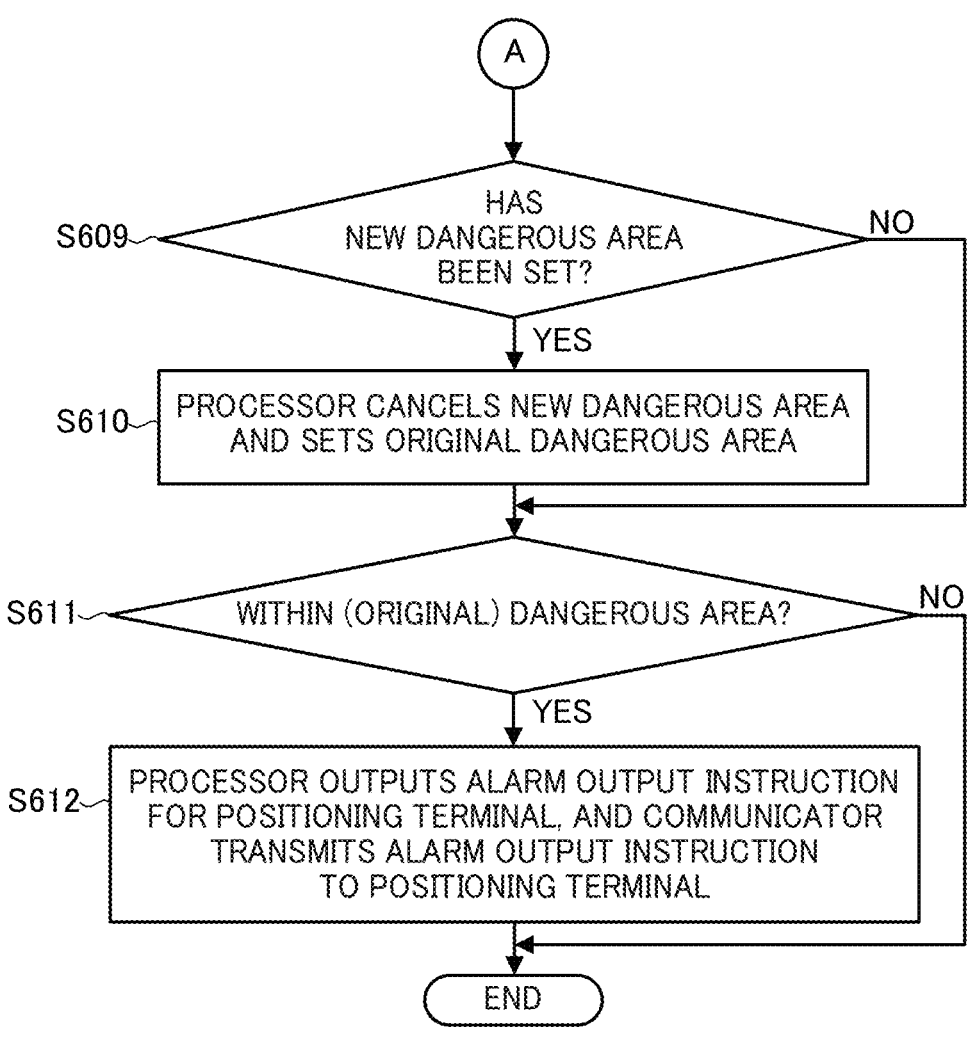
FIG. 6B is another diagram illustrating the other example of the operation of the host server according to Embodiment 1.

FIGS. 5, 6A, and 6B are diagrams illustrating examples of operation of host server 20 according to Embodiment 1. FIG. 5 relates to presetting of host server 20.

In step S501, processor 201 sets a dangerous area (includes a new dangerous area), the first predicted entry time threshold for outputting the first cautionary alarm, the second predicted entry time threshold for outputting the second cautionary alarm, or the non-alarm distance threshold. The process in FIG. 5 then ends.

As described above, a dangerous area might be statically or semi-statically set through a user input or might be dynamically set in accordance with movement of construction vehicle 50 on which positioning terminal 10 is mounted or the like. Various thresholds may be statically or semi-statically set through user inputs or may be fixed in alarm system 1. The process in FIG. 5 may thus be performed as necessary.

Next, another example of the operation of host server 20 will be described with reference to FIGS. 6A and 6B. An example will be described hereinafter where a predicted entry time threshold is not set (i.e., whether positioning terminal 10 is approaching a dangerous area is not determined), a non-alarm distance threshold is not set, and a dangerous area of a certain radius is set in advance around positioning terminal 10B mounted on construction vehicle 50.

In step S601, communicator 203 receives a positioning result of positioning terminal 10A transmitted from positioning terminal 10A and a positioning result of positioning terminal 10B and state information regarding construction vehicle 50 transmitted from positioning terminal 10B.

In step S602, processor 201 determines, on the basis of (information indicated by) the received state information regarding construction vehicle 50, whether construction vehicle 50 is traveling forward or backward or is stationary.

When determining that construction vehicle 50 is traveling forward, processor 201 generates or sets, in step S603, a new dangerous area as described above. Next, the flow proceeds to step S607.

When determining that construction vehicle 50 is traveling backward, processor 201 generates and sets, in step S604, a new dangerous area as described above. Next, the flow proceeds to step S607.

When determining that construction vehicle 50 is stationary, processor 201 determines, in step S605 on the basis of (a state indicated by) the received state information regarding construction vehicle 50, whether an arm of construction vehicle 50 is moving.

When determining that the arm of construction vehicle 50 is moving (YES in step S605), processor 201 generates and sets, in step S606, a new dangerous area as described above. Next, the flow proceeds to step S607.

When processor 201 determines that the arm of construction vehicle 50 is not moving (NO in step S605), on the other hand, the flow proceeds to step S609.

In step S607, processor 201 determines, on the basis of the set new dangerous area and the received positioning result (the position of positioning terminal 10A), whether positioning terminal 10A is located within the new dangerous area.

When determining that positioning terminal 10A is located within the new dangerous area (YES in step S607), processor 201 outputs, in step S608, an alarm output instruction for the entry alarm for positioning terminal 10A, and communicator 203 transmits the alarm output instruction to positioning terminal 10A. The flow then ends.

When processor 201 determines that positioning terminal 10A is not located within the new dangerous area (NO in step S607), on the other hand, the flow ends.

In step S609, processor 201 determines whether a new dangerous area relating to construction vehicle 50 has been set.

When determining that a new dangerous area has been set (YES in step S609), processor 201 cancels, in step S610, the new dangerous area and sets the original dangerous area. Next, the flow proceeds to step S611.

When processor 201 determines that a new dangerous area has not been set (NO in step S609), on the other hand, the flow proceeds to step S611.

In step S611, processor 201 determines, on the basis of the set (original) dangerous area and the received positioning result (the position of positioning terminal 10A), whether positioning terminal 10A is located within the dangerous area.

When determining that positioning terminal 10A is located within the dangerous area (YES in step S611), processor 201 outputs, in step S612, an alarm output instruction for the entry alarm for positioning terminal 10A, and communicator 203 transmits the alarm output instruction to positioning terminal 10A. The flow then ends.

When processor 201 determines that positioning terminal 10A is not located within the dangerous area (NO in step S611), the flow ends.

The process in FIGS. 6A and 6B is then repeated.

When a dangerous area of a certain radius is not set around positioning terminal 10B mounted on construction vehicle 50 and a new dangerous area is set only dynamically around positioning terminal 10B mounted on construction vehicle 50, processor 201 may just cancel the new dangerous area in step S610, and the flow may then end. When a new dangerous area is not set in step S609, the flow may end.

<Variations>

[Variation 1-1]

Although an example where a new dangerous area is dynamically and automatically set in accordance with forward and backward travel of construction vehicle 50 and rotation of a tip of an arm has been described above, the present disclosure is not limited to this example. For example, the present disclosure may be applied to a case where construction vehicle 50 is turning right or left.

Figure 14A:
FIG. 14A is a diagram illustrating an example of a new dangerous area at a time when a construction vehicle is turning right according to a variation of the embodiment of the present disclosure.
Figure 14A:
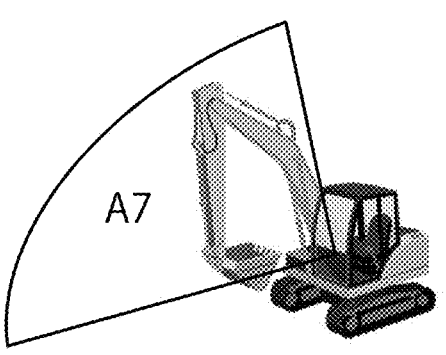
Figure 14B:
FIG. 14B is a diagram illustrating an example of a new dangerous area at a time when the construction vehicle is turning left according to the variation of the embodiment of the present disclosure.
Figure 14B:
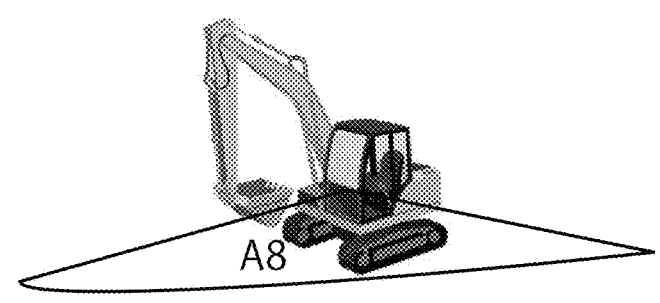

In this case, state information regarding construction vehicle 50 may include information indicating that construction vehicle 50 is turning right and information indicating that construction vehicle 50 is turning left. When construction vehicle 50 is turning right, a worker to the right of construction vehicle 50 relative to the forward direction can be exposed to danger. In this case, therefore, processor 201 can generate and set a new dangerous area as described above in a case where the tip of the arm is rotating rightward relative to the forward direction of construction vehicle 50. The same holds for a case where construction vehicle 50 is turning left. In other words, when construction vehicle 50 is turning right, processor 201 may generate and set a new dangerous area to the right of construction vehicle 50 relative to the forward direction, and when construction vehicle 50 is turning left, processor 201 may generate and set a new dangerous area to the left of construction vehicle 50 relative to the forward direction. FIG. 14A illustrates an example of new dangerous area A7 at a time when construction vehicle 50 is turning right according to a variation of the embodiment of the present disclosure, and FIG. 14B illustrates an example of new dangerous area A8 at a time when construction vehicle 50 is turning left according to the embodiment of the present disclosure. These new dangerous areas are set somewhere around positioning terminal 10B including a position of positioning terminal 10B.

[Variation 1-2]

Although an example where an alarm output instruction is provided for positioning terminal 10A associated with a worker has been described above, the present disclosure is not limited to this example. As implied above, a cautionary alarm output instruction may be provided for positioning terminal 10B associated with construction vehicle 50, and positioning terminal 10B may output an alarm in accordance with the alarm output instruction, instead.

When positioning terminal 10A enters a new dangerous area set in accordance with rotation of a tip of an arm, an arm control (emergency stop) instruction may be provided for positioning terminal 10B associated with construction vehicle 50 instead of, or in addition to, a cautionary alarm output instruction, and the vehicle control system, for example, of construction vehicle 50 that has received the instruction through positioning terminal 10B may bring the arm to an emergency stop in accordance with the instruction.

[Variation 1-3]

Although an example of entry of a worker into a dangerous area at a work site has been described above, the present disclosure is not limited to this example. For example, the present disclosure may be applied to entry of construction vehicle 50 driven by a worker and associated with positioning terminal 10B into a dangerous area associated with another construction vehicle 50.

More specifically, an example will be examined where first construction vehicle 50 driven by a first worker and associated with first positioning terminal 10B enters a new second dangerous area associated with second construction vehicle 50, which is different from first construction vehicle 50, driven by a second worker, who is different from the first worker, and associated with second positioning terminal 10B, which is different from first positioning terminal 10B. In this case, too, host server 20 sets a new second dangerous area on the basis of a positioning result of second positioning terminal 10B and a state of second construction vehicle 50 and determines entry of first positioning terminal 10B into the second dangerous area on the basis of the positioning result of second positioning terminal 10B and a position of the new second dangerous area. Host server 20 can then transmit, to first positioning terminal 10B and second positioning terminal 10B, an alarm output instruction for notifying of a possibility of collision between first construction vehicle 50 and second construction vehicle 50. In this case, host server 20 transmits the alarm output instruction to at least one of first positioning terminal 10B and second positioning terminal 10B, and upon receiving the alarm output instruction, first positioning terminal 10B may output an alarm in accordance with the alarm output instruction and/or second positioning terminal 10B may output an alarm in accordance with the alarm output instruction.

Alternatively, host server 20 may separately determine entry of first positioning terminal 10B into a new second dangerous area and entry of second positioning terminal 10B into a new first dangerous area associated with first construction vehicle 50. More specifically, host server 20 may, as described above, determine entry of first positioning terminal 10B into the new second dangerous area and transmit an alarm output instruction to first positioning terminal 10B to notify of a possibility of collision between first construction vehicle 50 and second construction vehicle 50. Host server 20 also sets the new first dangerous area on the basis of a positioning result of first positioning terminal 10B and a state of first construction vehicle 50 and determines entry of second positioning terminal 10B into the new first dangerous area on the basis of the positioning result of first positioning terminal 10B and a position of the new first dangerous area. Host server 20 can then transmit an alarm output instruction to second positioning terminal 10B to notify of a possibility of collision between first construction vehicle 50 and second construction vehicle 50.

[Variation 1-4]

Although an example where a shape of a dangerous area is a perfect circle has been described above, the present disclosure is not limited to this example. As implied above, a shape of a dangerous area may be a part of a perfect circle (a fan, an arrow, etc.), an oval or a part thereof (half an oval etc.), a polygon such as a triangle or a rectangle, or another shape, instead. In this case, the center of a dangerous area may be replaced by the center of gravity of the dangerous area. Similarly, a shape of a new dangerous area is not limited to a fan.

[Variation 1-5]

In Embodiment 1, positioning terminals 10 that output an alarm need not be all of the plurality of positioning terminals 10. For example, when construction vehicle 50 or the like on which positioning terminal 10 is mounted can only move along a fixed rail or does not have a mechanism for changing speed, it is difficult to take action to avoid danger even when an alarm is output. When an alarm is output even in this case, the alarm might be confused with another alarm, which might cause danger. It is therefore not necessarily beneficial for all the plurality of positioning terminals 10 to output an alarm. Positioning terminals 10 to output an alarm may be changed in accordance with specification by the operation manager or another person.

[Variation 1-6]

Although an example where host server 20 performs the processing in the present disclosure, such as the determination of approach and entry to a dangerous area, has been described above, the present disclosure is not limited to this example. For example, representative positioning terminal 10 among the plurality of positioning terminals 10 may receive a positioning result from each positioning terminal 10 and perform the processing in the present disclosure instead of host server 20.

Each positioning terminal 10 may perform the processing in the present disclosure, such as the determination of approach and entry to a dangerous area, instead. In this case, for example, each positioning terminal 10 may obtain information regarding a position and a range of a dangerous area therearound by sharing a position thereof with host server 20 or the like, and perform the processing such as the determination on the basis of the information.

<Effects>

According to Embodiment 1, a new dangerous area is dynamically set somewhere around positioning terminal 10B including a position of positioning terminal 10B on the basis of a state of construction vehicle 50 on which positioning terminal 10B is mounted and the position of positioning terminal 10B, and entry or approach of positioning terminal 10 to the new dangerous area is determined. An alarm output instruction for causing at least one of positioning terminal 10B and positioning terminal 10 to output an alarm for the entry or the approach is then provided for at least one of positioning terminal 10B and positioning terminal 10, and at least one of positioning terminal 10B and positioning terminal 10 outputs the alarm. As a result, since the new dangerous area is set somewhere around positioning terminal 10B in consideration of an element other than a distance to the positioning terminal (construction vehicle), alarms can be appropriately given to a worker associated with at least one of positioning terminal 10B and positioning terminal 10.

Embodiment 2

Next, Embodiment 2 of the present disclosure will be described. Embodiment 2 is different from Embodiment 1 in that RTK processing is performed not by positioning terminals but by a host server, that is, a processor of the host server measures (determines) positions of positioning terminals through the above-described RTK processing. Because configuration of alarm system 1', positioning terminals 10A', positioning terminals 10B', and host server 20' according to Embodiment 2 is the same as that of alarm system 1, positioning terminals 10A, positioning terminals 10B, and host server 20, differences from Embodiment 1 will be described.

Figure 7:
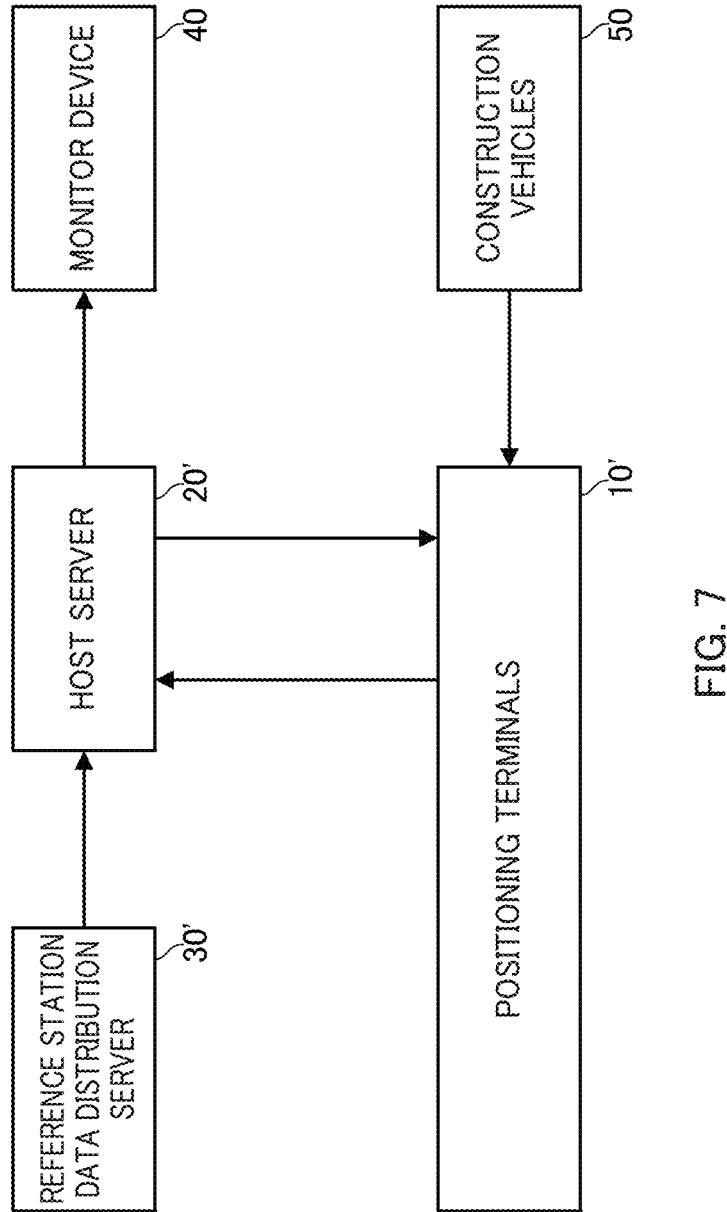
FIG. 7 is a diagram illustrating an example of an alarm system according to Embodiment 2 of the present disclosure.

FIG. 7 is a diagram illustrating an example of alarm system 1' according to Embodiment 2. As illustrated in FIG. 7, alarm system 1' includes positioning terminals 10' (positioning terminals 10A' or positioning terminals 10B' (positioning terminals 10B' are illustrated)), host server 20', reference station data distribution server 30', monitor device 40, and construction vehicles 50. Alarm system 1' may also be referred to as an information processing system or the like.

Unlike in Embodiment 1, positioning terminal 10' does not perform RTK processing and measure a position thereof. Positioning terminal 10', therefore, need not receive correction data from reference station data distribution server 30', and transmits, to host server 20', positioning terminal positioning data generated on the basis of a satellite signal received from a GNSS satellite. When positioning terminal 10' includes a velocity sensor and an acceleration sensor, positioning terminal 10' may transmit velocity and acceleration from the velocity sensor and the acceleration sensor, respectively, to host server 20'. Positioning terminal 10' is an example of the first terminal, the second terminal, the terminal, the different (other) terminal, or the information processing apparatus (corresponds to representative positioning terminal 10', which will be described later) in the present disclosure.

Host server 20' receives positioning terminal positioning data transmitted from positioning terminal 10' and correction data for performing RTK processing and measuring a position of positioning terminal 10' from reference station data distribution server 30'. Host server 20' is an example of the information processing apparatus in the present disclosure.

Host server 20' measures the position of positioning terminal 10' (also velocity and acceleration depending on the case) by performing RTK processing using the received positioning terminal positioning data and correction data. Host server 20' determines, on the basis of a set dangerous area, an obtained positioning result, and the like, approach and entry of positioning terminal 10' (positioning terminal 10A') carried by and associated with a worker to the dangerous area (i.e., detects an alarm event). Host server 20' may have a subset or all of functions of reference station data distribution server 30', instead. For example, host server 20' may receive correction data generated by a reference station from the reference station without using reference station data distribution server 30'.

Reference station data distribution server 30' transmits correction data for performing RTK processing and measuring a position of positioning terminal 10' to host server 20'.

<Configuration of Positioning Terminal>

Figure 8A:
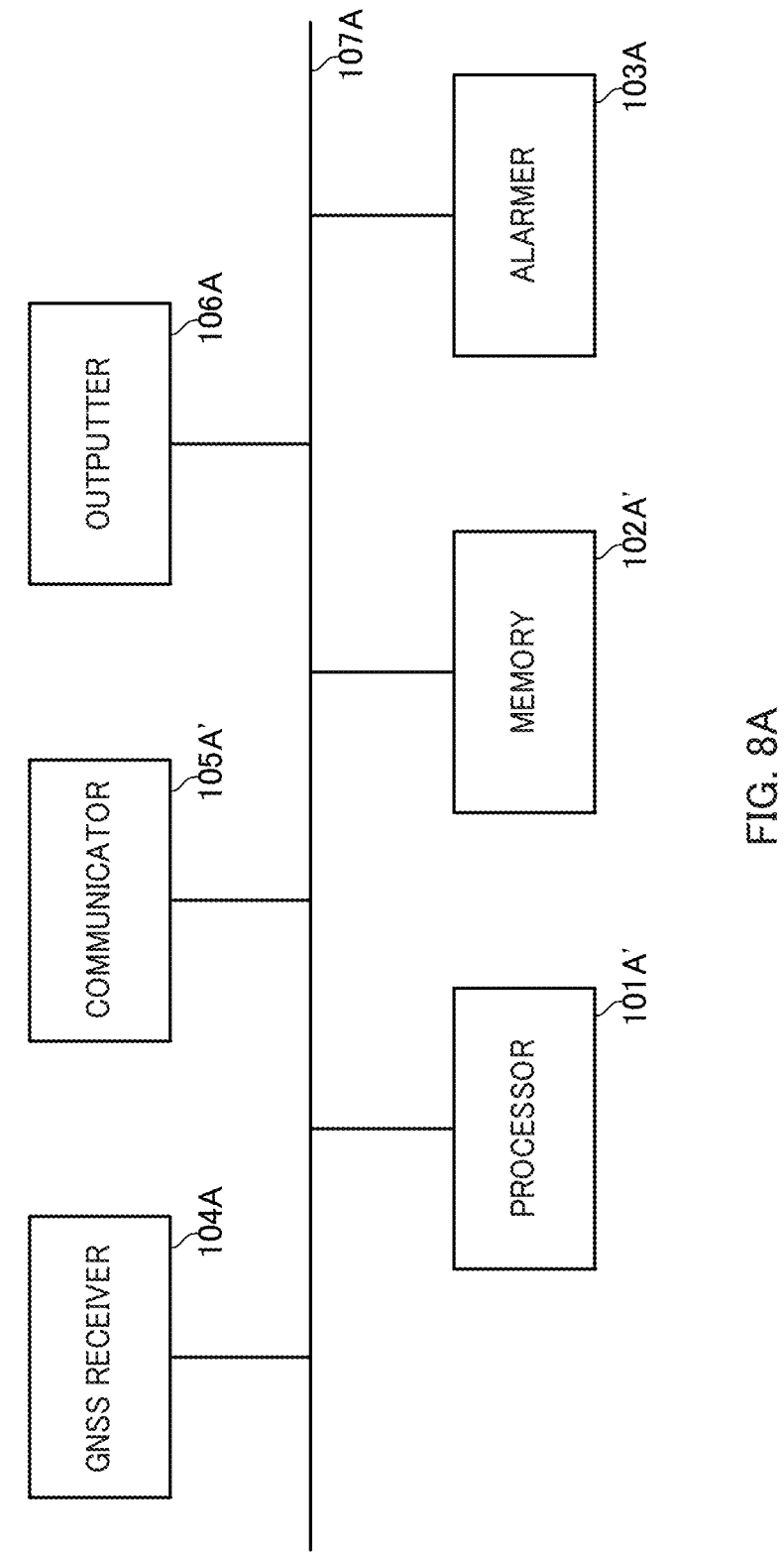
FIG. 8A is a diagram illustrating an example of configuration of a positioning terminal according to Embodiment 2.

FIG. 8A is a block diagram illustrating an example of configuration of positioning terminal 10A' according to Embodiment 2. As illustrated in FIG. 8A, positioning terminal 10A' includes processor 101A', memory 102A', alarmer 103A, GNSS receiver 104A, communicator 105A', outputter 106A, and bus 107A.

As described above, positioning terminal 10A' does not perform positioning based on RTK processing. Each time a satellite signal is received from a GNSS satellite, therefore, processor 101B' generates positioning terminal positioning data on the basis of the satellite signal and outputs the positioning terminal positioning data to memory 102A' and communicator 105A'.

Memory 102A' need not store correction data from reference station data distribution server 30'. Memory 102A' stores positioning terminal positioning data.

Each time a satellite signal is received from a GNSS satellite, communicator 105A' transmits positioning terminal positioning data input from processor 101A' to host server 20'. Communicator 105A' may receive a positioning result of positioning terminal 10A' transmitted from host server 20' and output the received positioning result to memory 102A'.

Processor 101A', memory 102A', alarmer 103A, GNSS receiver 104A, communicator 105A', and outputter 106A are communicably connected to one another through bus 107A.

Figure 8B:
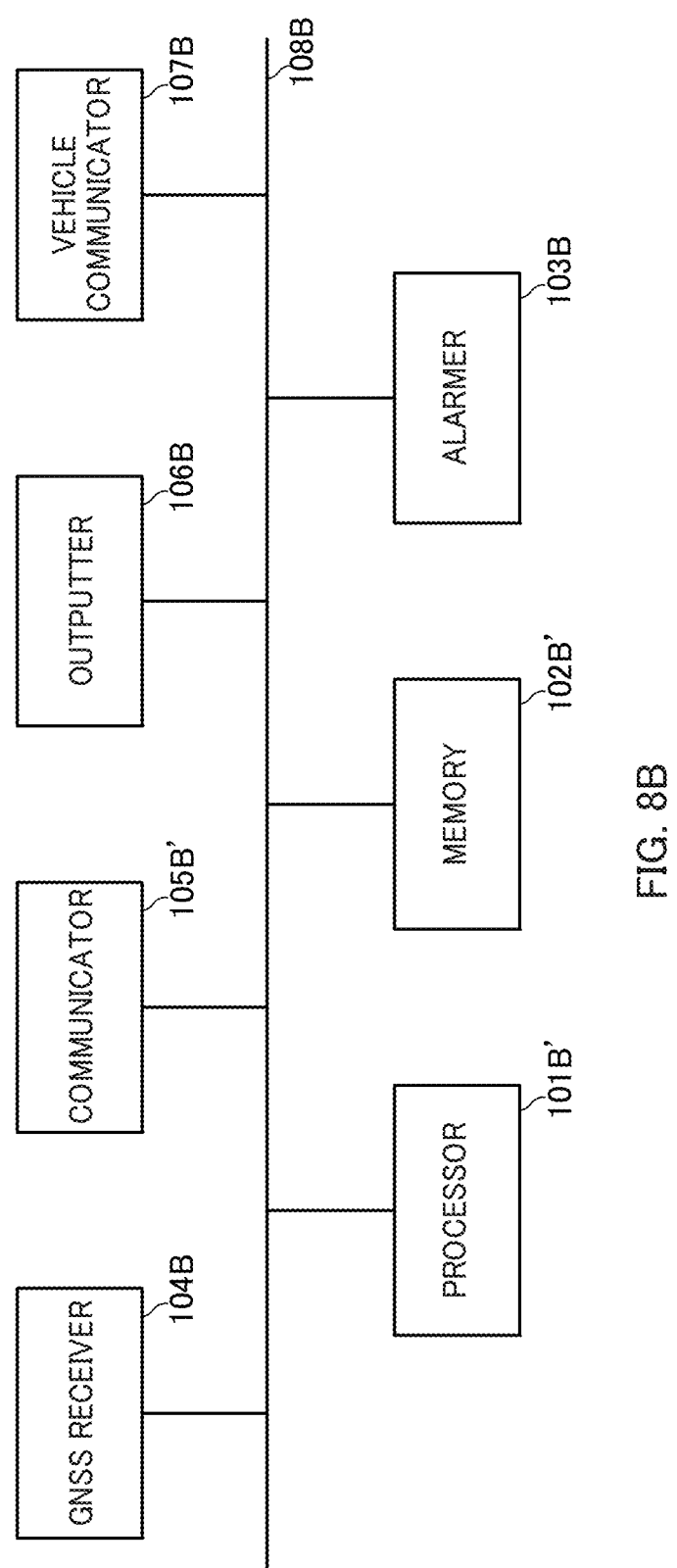
FIG. 8B is a diagram illustrating an example of configuration of another positioning terminal according to Embodiment 2.

FIG. 8B is a block diagram illustrating an example of configuration of positioning terminal 10B' according to Embodiment 2. As illustrated in FIG. 8B, positioning terminal 10B' includes processor 101B', memory 102B', alarmer 103B, GNSS receiver 104B, communicator 105B', outputter 106B, vehicle communicator 107B, and bus 108B.

As described above, positioning terminal 10B' does not perform positioning based on RTK processing. Each time a satellite signal is received from a GNSS satellite, therefore, processor 101B' generates positioning terminal positioning data on the basis of the satellite signal and outputs the positioning terminal positioning data to memory 102B' and communicator 105B'.

Memory 102B' need not store correction data from reference station data distribution server 30'. Memory 102A' stores positioning terminal positioning data.

Each time a satellite signal is received from a GNSS satellite, communicator 105B' transmits, to host server 20', positioning terminal positioning data input from processor 101A' and latest state information regarding construction vehicle 50 input from vehicle communicator 107B. Communicator 105B' may receive a positioning result of positioning terminal 10B' transmitted from host server 20' and output the received positioning result to memory 102B'.

Processor 101B', memory 102B', alarmer 103B, GNSS receiver 104B, communicator 105B', outputter 106B, and vehicle communicator 107B are communicably connected to one another through bus 108B.

When processor 101A' and processor 101B' need not be distinguished from each other in the following description, processor 101A' and processor 101B' might be referred to as processors 101'. When alarmer 103A and alarmer 103B need not be distinguished from each other, alarmer 103A and alarmer 103B might be referred to as alarmers 103. When communicator 105A' and communicator 105B' need not be distinguished from each other, communicator 105A' and communicator 105B' might be referred to as communicators 105'.

<Configuration of Host Server>

Figure 9:
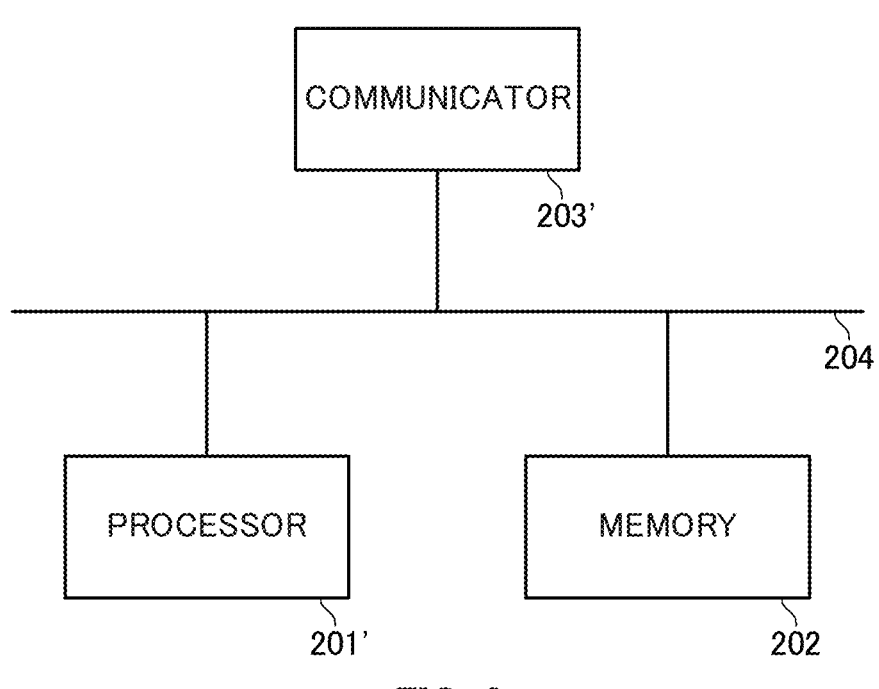
FIG. 9 is a diagram illustrating an example of configuration of a host server according to Embodiment 2.

FIG. 9 is a block diagram illustrating an example of configuration of host server 20' according to Embodiment 2. As illustrated in FIG. 9, host server 20' includes processor 201', memory 202, communicator 203', and bus 204.

Unlike in Embodiment 1, for example, each time positioning terminal positioning data is received from positioning terminal 10', processor 201' performs RTK processing and measures (determines) a position, velocity, acceleration, and a travel direction of positioning terminal 10' on the basis of the positioning terminal positioning data and correction data received from a GNSS satellite. Processor 201' outputs a positioning result obtained in this manner to communicator 203' and memory 202. Processor 201' predicts, on the basis of the obtained positioning result and a set dangerous area, a time at which positioning terminal 10A' associated with a worker will enter the dangerous area (i.e., a predicted time at which positioning terminal 10A' will reach the dangerous area).

When a dangerous area relates to an area of construction vehicle 50, processor 201' may dynamically and automatically set a new dangerous area on the basis of a positioning result of positioning terminal 10B' associated with construction vehicle 50 and a state of construction vehicle 50. Processor 201' may generate information indicating that construction vehicle 50 is traveling forward, information indicating construction vehicle 50 is traveling backward, information indicating that construction vehicle 50 is turning right, information indicating that construction vehicle 50 is turning left, and information indicating that construction vehicle 50 is stationary in the state information regarding construction vehicle 50 also on the basis of the obtained positioning result (e.g., a position and velocity) of positioning terminal 10B'. The new dangerous area may be set, for example, as described above. The new dangerous area includes the position of positioning terminal 10B' associated with construction vehicle 50 and set somewhere around positioning terminal 10B'.

Processor 201' determines approach and entry of positioning terminal 10A' to the set dangerous area (detects an alarm event) on the basis of at least the positioning result, a predicted entry time threshold, a non-alarm distance threshold, or the dangerous area.

Processor 201' transmits information such as the set dangerous area, the positioning result, and positioning terminal 10' to which an alarm output instruction is to be transmitted to monitor device 40 through communicator 203' to display the information.

Communicator 203' receives positioning terminal positioning data transmitted from positioning terminal 10'. Communicator 203' outputs the positioning terminal positioning data to processor 201' and memory 202. Communicator 203' may transmit a positioning result to positioning terminal 10'.

Processor 201', memory 202, and communicator 203' are communicably connected to one another through bus 204.

<Operation of Alarm System>

Next, examples of operation of alarm system 1' according to Embodiment 2 will be described with reference to FIGS. 10A, 10B, 11A, and 11B.

[Operation of Positioning Terminal]

Figure 10A:
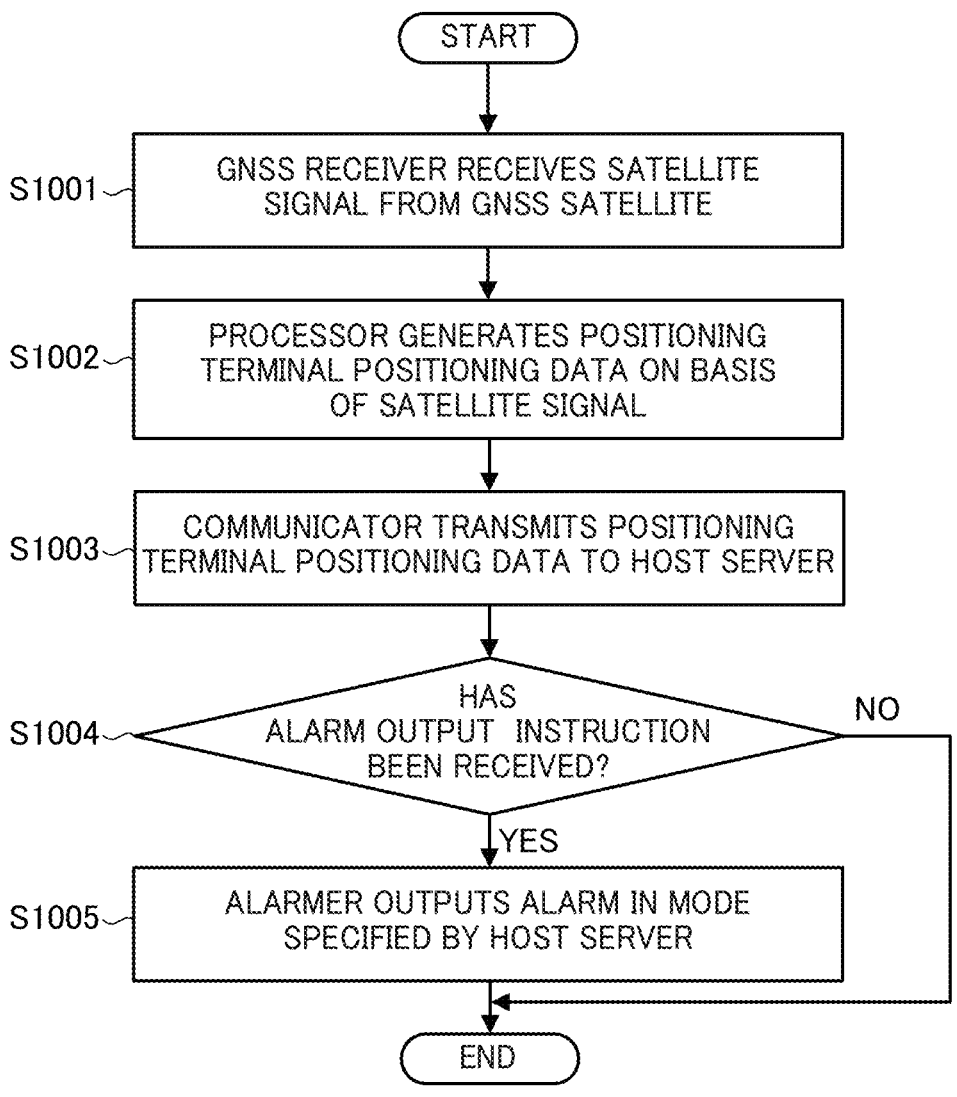
FIG. 10A is a diagram illustrating an example of operation of the positioning terminal according to Embodiment 2.

FIG. 10A is a diagram illustrating an example of operation of positioning terminal 10A' according to Embodiment 2.

In step S1001, GNSS receiver 104A receives a satellite signal transmitted from a GNSS satellite.

In step S1002, processor 101A' generates positioning terminal positioning data on the basis of the satellite signal.

In step S1003, communicator 105A' transmits the positioning terminal positioning data to host server 20'.

In step S1004, processor 101A' or communicator 105A' determines whether communicator 105A' has received an alarm output instruction (e.g., within a certain period of time since the transmission of the positioning terminal positioning data).

When communicator 105A' has received an alarm output instruction (e.g., within the certain period of time since the transmission of the positioning terminal positioning data)

(YES in step S1004), alarmer 103A outputs, in step S1005, an alarm in a style specified (determined) by host server 20'. The flow then ends.

When communicator 105A' has not received an alarm output instruction (e.g., within the certain period of time since the transmission of the positioning terminal positioning data) (NO in step S1004), on the other hand, the flow ends.

The process in FIG. 10A is then repeated.

Figure 10B:
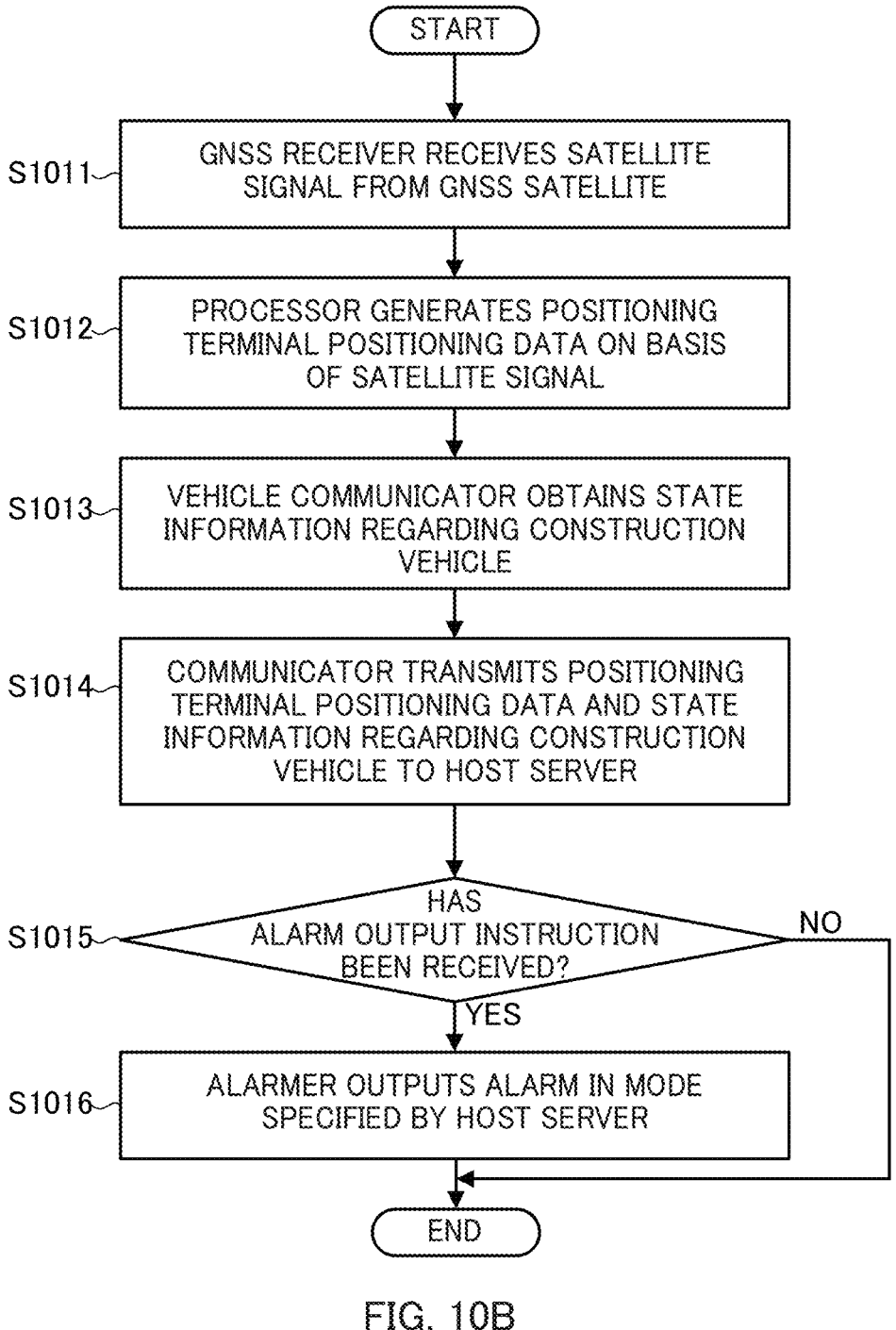
FIG. 10B is a diagram illustrating an example of operation of the other positioning terminal according to Embodiment 2.

FIG. 10B is a diagram illustrating an example of operation of positioning terminal 10B' according to Embodiment 2.

In step S1011, GNSS receiver 104B receives a satellite signal transmitted from a GNSS satellite.

In step S1012, processor 101B' generates positioning terminal positioning data on the basis of the satellite signal.

In step S1013, vehicle communicator 107B obtains state information regarding construction vehicle 50 from (e.g., the vehicle control system of) construction vehicle 50.

In step S1014, communicator 105B' transmits the positioning terminal positioning data and the state information regarding construction vehicle 50 to host server 20'.

In step S1015, processor 101B' or communicator 105B' determines whether communicator 105B' has received an alarm output instruction (e.g., within a certain period of time since the transmission of the positioning result).

When communicator 105B' has received an alarm output instruction (e.g., within the certain period of time since the transmission of the positioning result) (YES in step S1015), alarmer 103B outputs, in step S1016, an alarm in a style specified (determined) by host server 20'. The flow then ends.

When communicator 105B' has not received an alarm output instruction (e.g., within the certain period of time since the transmission of the positioning result) (NO in step S1015), on the other hand, the flow ends.

The process in FIG. 10B is then repeated.

[Operation of Host Server]

A process relating to presetting of host server 20' is the same as the process already described with reference to FIG. 5, and description thereof is omitted here.

Figure 11A:
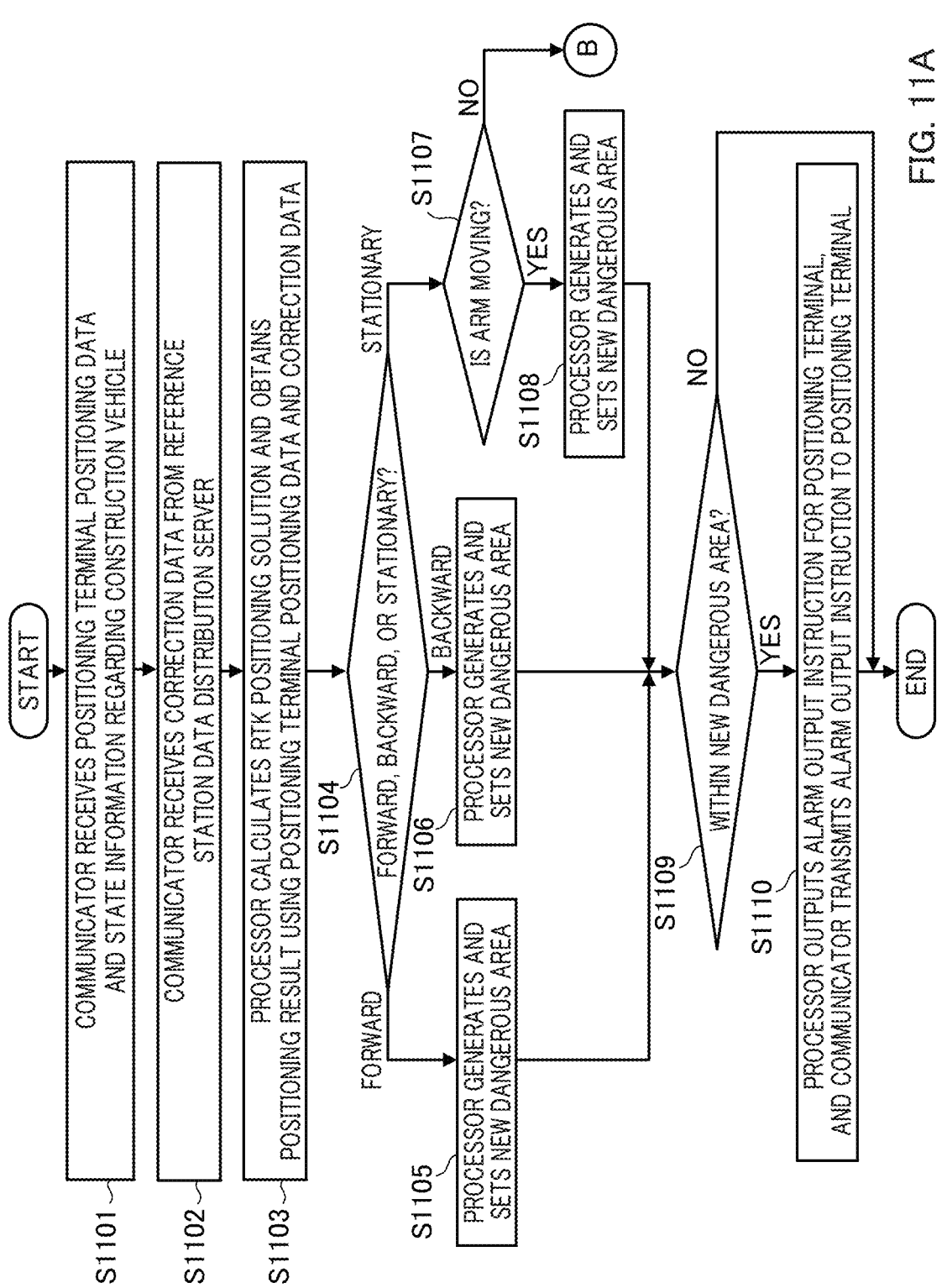
FIG. 11A is a diagram illustrating an example of operation of the host server according to Embodiment 2.
Figure 11B:
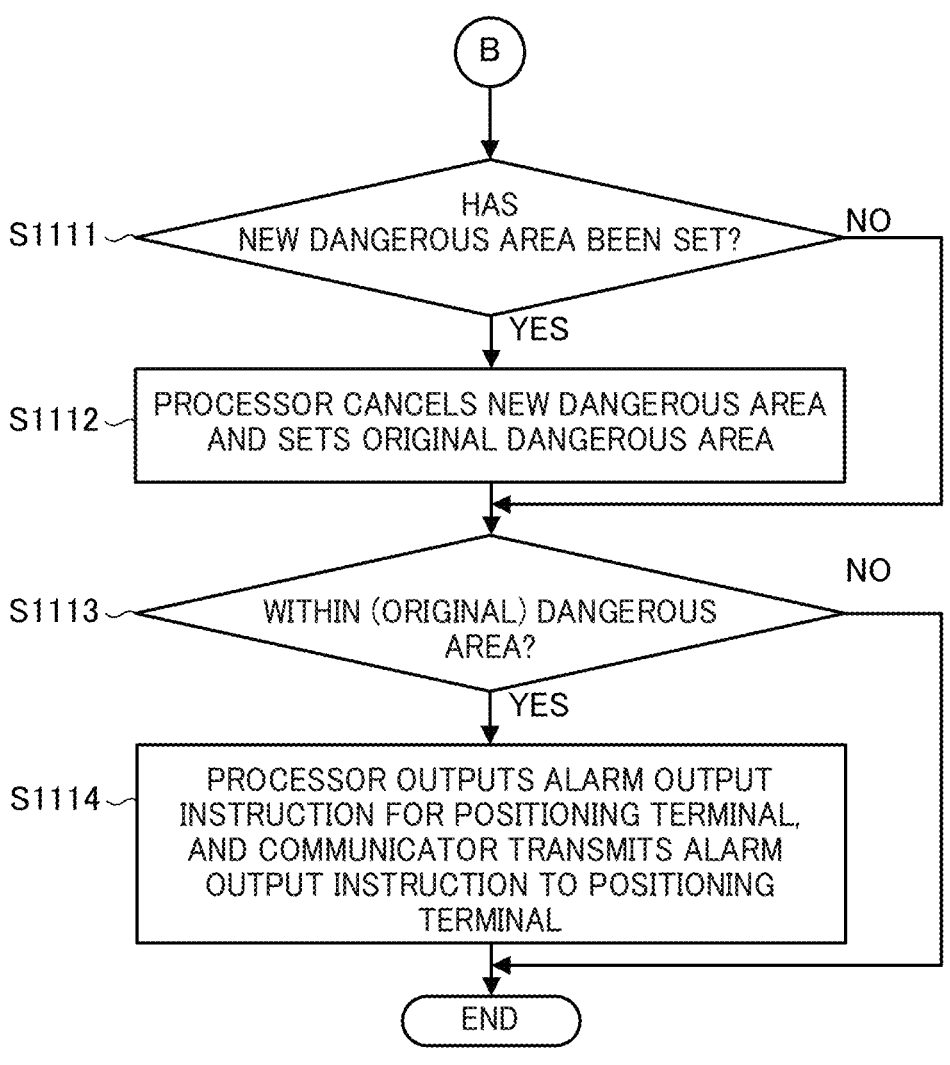
FIG. 11B is another diagram illustrating the example of the operation of the host server according to Embodiment 2.

FIGS. 11A and 11B are diagrams illustrating an example of operation of host server 20' according to Embodiment 2. Here, too, an example will be described where a predicted entry time threshold is not set (i.e., whether positioning terminal 10' is approaching a dangerous area is not determined), a non-alarm distance threshold is not set, and a dangerous area of a certain radius is set in advance around positioning terminal 10B' mounted on construction vehicle 50.

In step S1101, communicator 203' receives positioning terminal positioning data transmitted from positioning terminal 10A' and positioning terminal positioning data and state information regarding construction vehicle 50 transmitted from positioning terminal 10B'.

In step S1102, communicator 203' receives correction data transmitted from reference station data distribution server 30'.

In step S1103, processor 201' performs RTK processing using the positioning terminal positioning data and the correction data to calculate an RTK positioning solution and obtain a positioning result.

In step S1104, processor 201' determines, on the basis of (information indicated by) the received state information regarding construction vehicle 50, whether construction vehicle 50 is traveling forward or backward or is stationary.

When determining that construction vehicle 50 is traveling forward, processor 201' generates or sets, in step S1105, a new dangerous area as described above. Next, the flow proceeds to step 1109.

When determining that construction vehicle 50 is traveling backward, processor 201' generates and sets, in step S1106, a new dangerous area as described above. Next, the flow proceeds to step 1109.

When determining that construction vehicle 50 is stationary, processor 201' determines, in step S1107 on the basis of (a state indicated by) the received state information regarding construction vehicle 50, whether an arm of construction vehicle 50 is moving.

When determining that the arm of construction vehicle 50 is moving (YES in step S1107), processor 201' generates and sets, in step S1108, a new dangerous area as described above. Next, the flow proceeds to step S1109.

When processor 201 determines that the arm of construction vehicle 50 is not moving (NO in step S1107), on the other hand, the flow proceeds to step S1111.

In step S1109, processor 201' determines, on the basis of the set new dangerous area and the obtained positioning result (a position of positioning terminal 10A'), whether positioning terminal 10A' is located within the new dangerous area.

When determining that positioning terminal 10A is located within the new dangerous area (YES in step S1109), processor 201' outputs, in step S1110, an alarm output instruction for the entry alarm for positioning terminal 10A', and communicator 203' transmits the alarm output instruction to positioning terminal 10A'. The flow then ends.

When processor 201' determines that positioning terminal 10A' is not located within the new dangerous area (NO in step S1109), on the other hand, the flow ends.

In step S1111, processor 201' determines whether a new dangerous area relating to construction vehicle 50 has been set.

When determining that a new dangerous area has been set (YES in step S1111), processor 201' cancels, in step S1112, the new dangerous area and sets the original dangerous area. Next, the flow proceeds to step S1113.

When processor 201' determines that a new dangerous area has not been set (NO in step S1111), on the other hand, the flow proceeds to step S1113.

In step S1113, processor 201' determines, on the basis of the set (original) dangerous area and the obtained positioning result (the position of positioning terminal 10A'), whether positioning terminal 10A' is located within the dangerous area.

When determining that positioning terminal 10A' is located within the dangerous area (YES in step S1113), processor 201' outputs, in step S1114, an alarm output instruction for the entry alarm for positioning terminal 10A', and communicator 203' transmits the alarm output instruction to positioning terminal 10A'. The flow then ends.

When processor 201' determines that positioning terminal 10A' is not located within the dangerous area (NO in step S1113), on the other hand, the flow ends.

The process in FIGS. 11A and 11B is then repeated.

When a dangerous area of a certain radius is not set around positioning terminal 10B' mounted on construction vehicle 50 and a new dangerous area is set only dynamically around positioning terminal 10B' mounted on construction vehicle 50, processor 201' may just cancel the new dangerous area in step S1112, and the flow may then end. When a new dangerous area is not set in step S1111, the flow may end.

<Variations>

[Variation 2-1]

In Embodiment 2, too, Variation 1-1 of Embodiment 1 may be applied.

[Variation 2-2]

In Embodiment 2, too, Variation 1-2 of Embodiment 1 may be applied.

[Variation 2-3]

In Embodiment 2, too, Variation 1-3 of Embodiment 1 may be applied.

[Variation 2-4]

In Embodiment 2, too, Variation 1-4 of Embodiment 1 may be applied.

[Variation 2-5]

In Embodiment 2, too, Variation 1-5 of Embodiment 1 may be applied.

[Variation 2-6]

Although an example where host server 20' performs the processing in the present disclosure, such as the determination of approach and entry to a dangerous area, has been described above, the present disclosure is not limited to this example. For example, representative positioning terminal 10' among the plurality of positioning terminals 10' may receive positioning terminal positioning data from each positioning terminal 10' and perform the processing in the present disclosure instead of host server 20'.

<Effects>

According to Embodiment 2, a new dangerous area is dynamically set somewhere around positioning terminal 10B' including a position of positioning terminal 10B' on the basis of a state of construction vehicle 50 on which positioning terminal 10B' is mounted and the position of positioning terminal 10B', and entry or approach of positioning terminal 10' to the new dangerous area is determined. An alarm output instruction for causing at least one of positioning terminal 10B' and positioning terminal 10' to output an alarm for the entry or the approach is then provided for at least one of positioning terminal 10B' and positioning terminal 10', and at least one of positioning terminal 10B' and positioning terminal 10' outputs the alarm. As a result, since the new dangerous area is set somewhere around positioning terminal 10B' in consideration of an element other than a distance to the positioning terminal (construction vehicle), alarms can be appropriately given to a worker associated with at least one of positioning terminal 10B' and positioning terminal 10'.

In addition, according to Embodiment 2, since RTK processing for measuring the positions of positioning terminals 10' is performed not by positioning terminals 10' but by host server 20' or representative positioning terminal 10', a processing load of each positioning terminal 10' can be reduced.

Other Variations of Embodiments

Although a position of positioning terminal 10 or 10' is calculated through RTK processing in the above-described embodiments, the position may be calculated using one of other positioning methods, instead. The other positioning methods include, for example, a conventional GPS method, in which a position of positioning terminal 10 or 10' is calculated only on the basis of a signal from a satellite, a differential GPS method, in which correction data different from data obtained through RTK processing is used, and a method in which a signal from a beacon provided nearby is used without using a signal from a satellite. In addition, a position of positioning terminal 10 or 10' may be calculated using a plurality of positioning methods, instead of using a single positioning method. For example, a method for calculating a position of positioning terminal 10 or 10' may be switched in an environment where a signal from a satellite can be stably received, such as outdoors, and an environment where quality of a signal from a satellite tends to deteriorate, such as indoors. That is, it is only required in the above-described embodiments that a position of positioning terminal 10 or 10' be calculated using a positioning method, and any positioning method may be used. RTK processing, however, can be used to calculate a more accurate position than other positioning methods in an environment where high-quality signals can be received from a satellite. It is therefore preferable to use RTK processing in an environment where there are few objects that block signals from a satellite and an error in a position tends to lead to an accident, such as an outdoor construction site.

Although an entry alarm is output using a buzzer or a beep sound in the above embodiments, an entry alarm may be output in another style, instead. For example, an entry alarm may be output using another sound such as "Approaching a dangerous area". An alarm need not be a sound. When a light emitter such as an LED is mounted on positioning terminal 10 or 10', an entry alarm may be output by controlling flashing or intensity of lighting of the light emitter. When a vibrator is mounted on positioning terminal 10 or 10', an entry alarm may be output by controlling a cycle or intensity of vibration of positioning terminal 10 or 10'. A plurality of the above-described entry alarms may be combined together. When an alarm is given in a style other than a sound, intensity of the alarm may be changed by increasing the amount of light or vibration or shortening a period of the alarm.

Although approach to a dangerous area is determined on the basis of a predicted entry time in the above embodiments, the determination may be made using another method, instead. When a current position is inside each area, for example, approach may be determined. Similarly, a non-alarm distance threshold need not be provided.

Although workers and construction vehicles at a work site have been described as an example in the above embodiments, the present disclosure may be applied to another environment insofar as alarms need to be output for movement of persons who own positioning terminals 10 or 10' or vehicles including positioning terminals 10 or 10'. It is conceivable, for example, that the present disclosure is applied to firefighters and fire engines in firefighting, pedestrians and automobiles in automated driving, or the like. An example where a new dangerous area is changed in accordance with a state of an arm provided for construction vehicle 50 has been described in the above embodiments. The idea of the above embodiments may be applied to an apparatus (included in a mobile object) other than the arm, insofar as the apparatus is a movable part capable of moving without accompanying movement of the mobile object. More specifically, a ladder provided for a fire engine or the like is conceivable as such an apparatus.

In the above embodiments, whether a movable part (e.g., an arm) is moving is determined while a mobile object (e.g., construction vehicle 50) is stationary. Whether a movable part is moving, however, may be determined while a mobile object is moving. In this case, since it is more dangerous when the movable part is moving while the mobile object is moving than when the movable part is moving while the mobile object is stationary, a new dangerous area may be expanded in area.

Since a range of a new dangerous area changes as a state of a mobile object or a movable part changes in the above embodiments, there might be positioning terminal 10 or 10' determined to be entering the new dangerous area as a result of the change. In this case, because it is suddenly determined that positioning terminal 10 or 10' is entering the dangerous area and an alarm is output even when a worker who owns positioning terminal 10 or 10' has not moved at all, the worker might think that the alarm has been erroneously output. An alarm given to positioning terminal 10 or 10' determined to be entering a new dangerous area as a result of a change in a state of a mobile object or a movable part, therefore, may be different from an alarm given to positioning terminal 10 or 10' determined to be entering a dangerous area before and after a change in a state of a mobile object or a movable part. As a result, a worker who owns positioning terminal 10 determined to be entering a new dangerous area can understand that positioning terminal 10 has been determined to be entering the new dangerous area on the basis of a special circumstance, namely a change in a state of a mobile object or a movable part. In addition, in this case, the alarm given to positioning terminal 10 or 10' determined to be entering a new dangerous area may be more intense than the alarm given to positioning terminal 10 or 10' determined to be entering a dangerous area before and after a change in a state of a mobile object or a movable part. In doing so, it becomes more likely for a worker to notice that an alarm has been newly given to him/her.

Although a new dangerous area has been described in the above embodiments while focusing on a direction in which area is changed in accordance with a state of a mobile object or a movable part, a new dangerous area may be set in a different direction, instead. Although new dangerous areas are not illustrated in FIG. 12 to the left and right of construction vehicle 50 relative to the travel direction and in FIG. 13 in parts that have little to do with the rotation of the tip of the arm, for example, new dangerous areas may also be set in these parts. This is because even in directions that have little to do with the travel direction of the mobile object or a movable range of the movable part, contact between a worker and the mobile object is still dangerous. In this case, different alarms may be given between new dangerous areas in directions corresponding to the state of the mobile object or the movable part and new dangerous areas in other directions. Since directions corresponding to the state of the mobile object or the movable part are especially dangerous, for example, intensity of an alarm may be higher than in other directions. In directions that have little to do with the state of the mobile object or the movable part, new dangerous areas need not be set. In doing so, excessive output of alarms can be suppressed.

In the above embodiments, new dangerous areas are set in both the travel direction and the opposite direction of the mobile object, and a new dangerous area is set in only a range corresponding to the movable range of the movable part. A new dangerous area, however, need not be set in the opposite direction of the travel direction of the mobile object across the mobile object, or a new dangerous area may be set at a position opposite the movable part of the mobile object across the mobile object. That is, the new dangerous area set in the opposite direction of the direction corresponding to the state of the mobile object or the movable part may have any area larger than or equal to zero insofar as a new dangerous area larger than that in the opposite direction is set in the direction corresponding to the state of the mobile object or the movable part. In doing so, excessive output of alarms can be suppressed in a range that has little to do with the state of the mobile object or the movable part, where there is relatively little risk.

An example where a new dangerous area is changed in area in accordance with a state of a mobile object or a movable part has been described. When a travel direction of the mobile object or a direction in which the movable part can be moved is limited, however, a new dangerous area in a direction corresponding to the state of the mobile object or the movable part need not necessarily be set large. This is because expansion of a new dangerous area to a range that cannot be reached by the mobile object or the movable part leads to excessive output of alarms. In addition, in this case, the new dangerous area set in the direction corresponding to the state of the mobile object or the movable part may be smaller than a new dangerous area set in an opposite direction. For example, it might be desirable for the sake of a worker's safety to set a short but wide new dangerous area in a range around the mobile object that is hard for a driver to see, such as a rearward direction when the mobile object is traveling forward. In this case, when a long but narrow area is set as a new dangerous area ahead and a short but wide area is set as a new dangerous area behind, the new dangerous area ahead might be smaller than the new dangerous area behind. That is, the area relationships in the above embodiments are examples, and it is only required that at least a distance from positioning terminal 10 or 10' to a circumference of a new dangerous area be longer in the direction corresponding to the state of the mobile object or the movable part than in the opposite direction. Here, in an example, the distance to the circumference of the dangerous area may be a longest distance from positioning terminal 10 or 10' to the circumference of the new dangerous area, but may be another distance, such as an average or a median of distances from positioning terminal 10 or 10' to the circumference of the new dangerous area, instead.

Summary of Embodiments

An information processing apparatus (representative positioning terminal 10 or 10' or host server 20 or 20') according to an embodiment of the present disclosure includes a processor (processor 101, 101', 201, or 201') that dynamically sets an area (new dangerous area) somewhere around a first terminal (positioning terminal 10B or 10B') including a position of the first terminal based on a state of a mobile object (construction vehicle 50) on which the first terminal is mounted and the position of the first terminal and that determines entry or approach of a second terminal (positioning terminal 10 or 10') to the area and a communicator (communicator 105, 105', 203, or 203') that transmits, to the second terminal, a signal (alarm output instruction) for causing the second terminal to output an alarm for the entry or the approach.

With the above configuration, an area is dynamically set somewhere around a first terminal including a position of the first terminal on the basis of a state of a mobile object on which the first terminal is mounted and the position of the first terminal, and entry or approach of a second terminal to the area is determined. A signal for causing the second terminal to output an alarm for the entry or the approach is then provided for the second terminal. As a result, since the area is set somewhere around the first terminal in consideration of an element other than a distance to the terminal (mobile object), alarms can be appropriately given to a worker associated with the second terminal.

In the information processing apparatus, the state of the mobile object is a state of movement of the mobile object. The processor sets the area such that a part of the area corresponding to a travel direction of the mobile object becomes larger than a part of the area opposite the part corresponding to the travel direction of the mobile object across the mobile object.

With the above configuration, a person who is located in the travel direction of the mobile object and who is more likely to be exposed to danger (e.g., a worker carrying the second terminal or a worker driving another mobile object on which the second terminal is mounted) is more likely to be able to perform an operation or the like more safely, and excessive output of alarms can be suppressed in an opposite side (opposite the travel direction) across the mobile object.

In the information processing apparatus, when the mobile object is traveling forward, the processor sets the area including a first part ahead of the mobile object and a second part, which is smaller than the first part, behind the mobile object. When the mobile object is traveling backward, the processor sets the area including a third part behind the mobile object and a fourth part, which is smaller than the third part, ahead of the mobile object.

With this configuration, a person who is located ahead of or behind the mobile object and who is more likely to be exposed to danger (e.g., a worker carrying the second terminal or a worker driving another mobile object on which the second terminal is mounted) is more likely to be able to perform an operation or the like more safely, and excessive output of alarms can be suppressed in a side opposite the travel direction.

In the information processing apparatus, when the mobile object is turning, the processor sets the area such that a part of the area inside the turn becomes larger than a part of the area outside the turn.

With the above configuration, a person who is located inside the turn of the mobile object and who is more likely to be exposed to danger (e.g., a worker carrying the second terminal or a worker driving another mobile object on which the second terminal is mounted) is more likely to be able to perform an operation or the like more safely, and excessive output of alarms can be suppressed outside the turn of the mobile object.

In the information processing apparatus, the state of the mobile object is a state of movement of a movable part that is included in the mobile object and that moves without accompanying movement of the mobile object.

With the above configuration, alarms can be appropriately given to the worker associated with the second terminal in consideration of not movement of the mobile object itself but movement of the movable part included in the mobile object.

In the information processing apparatus, when a tip of the movable part is rotating, the processor sets the area such that a part of the area inside the rotation becomes larger than a part of the area outside the rotation.

With the above configuration, a person who is located inside the rotation of the tip of the movable part and who is more likely to be exposed to danger (e.g., a worker carrying the second terminal or a worker driving another mobile object on which the second terminal is mounted) is more likely to be able to perform an operation or the like more safely, and excessive output of alarms can be suppressed outside the rotation of the tip of the movable part.

In the information processing apparatus, the processor adjusts size of the area in accordance with at least rotation speed or reach of the tip of the movable part.

With the above configuration, the size of the area can be adjusted in accordance with a possibility of exposure to danger.

In the information processing apparatus, when the movable part is moving while the mobile object is moving, the processor sets the area such that the area becomes larger than when the movable part is moving while the mobile object is stationary.

With the above configuration, an operation or the like can be performed more safely while the mobile object is moving, when a possibility of danger is higher.

In the information processing apparatus, the communicator transmits a signal for causing the second terminal that was not determined to be entering the area before the state of the mobile object changed but that has been determined to be entering the area as a result of the change in the state of the mobile object to output an alarm different from an alarm for the second terminal that has been determined to be entering the area before and after the change in the state of the mobile object.

With the above configuration, a worker associated with the second terminal determined to be entering the area as a result of a change in the state of the mobile object can understand that the second terminal has been determined to be entering the area on the basis of a special circumstance, namely the change in the state of the mobile object.

In the information processing apparatus (representative positioning terminal 10 or host server 20), the communicator (communicator 105 or 203) receives, from the second terminal (positioning terminal 10), a position of the second terminal determined based on RTK (real-time kinematic) processing.

With the above configuration, an accurate position of the second terminal can be obtained, and entry or approach of the second terminal to the area can be determined more accurately.

In the information processing apparatus (representative positioning terminal 10' or host server 20'), the processor (processor 101' or 201') determines a position of the second terminal (positioning terminal 10') based on RTK processing.

With the above configuration, an accurate position of the second terminal can be obtained, and entry or approach of the second terminal to the area can be determined more accurately.

In the information processing apparatus, the communicator transmits, to the first terminal, a signal for causing the first terminal to output an alarm for the entry or the approach.

With the above configuration, a signal for outputting an alarm is also provided for the first terminal, and the worker associated with the second terminal is more likely to be able to perform an operation or the like more safely.

A terminal (positioning terminal 10 or 10') according to another embodiment of the present disclosure includes a processor (processor 101 or 101') that determines a position of the terminal and an alarmer (alarmer 103) that outputs an alarm for entry or approach of the terminal to an area (new dangerous area) dynamically set at least somewhere around another terminal (positioning terminal 10B or 10B') including a position of the other terminal, the other terminal being different from the terminal and mounted on a mobile object (construction vehicle 50). The area is dynamically set based on a state of the mobile object and the position of the other terminal.

With the above configuration, an area is dynamically set somewhere around another terminal including a position of the other terminal on the basis of a state of a mobile object on which the other terminal is mounted and the position of the other terminal, and entry or approach of the terminal to the area is determined. The terminal then outputs an alarm for the entry or the approach. As a result, since the area is set somewhere around the other terminal in consideration of an element other than a distance to the terminal (mobile object), alarms can be appropriately given to a worker associated with the terminal.

The terminal further includes a communicator that transmits the position of the terminal to an information processing apparatus (representative positioning terminal 10 or 10' or host server 20 or 20') and that receives, from the information processing apparatus, a signal for causing the terminal to output the alarm. The alarmer outputs the alarm in accordance with the signal.

With the above configuration, since the information processing apparatus determines whether the terminal is to output an alarm, a processing load of the terminal can be reduced.

An information processing method according to another embodiment of the present disclosure used by an information processing apparatus (representative positioning terminal 10 or 10' or host server 20 or 20') includes dynamically setting an area (new dangerous area) somewhere around a first terminal (positioning terminal 10B or 10B') including a position of the first terminal based on a state of a mobile object (construction vehicle 50) on which the first terminal is mounted and the position of the first terminal, determining entry or approach of a second terminal (positioning terminal 10 or 10') to the area, and transmitting, to the second terminal, a signal (alarm output instruction) for causing the second terminal to output an alarm for the entry or the approach.

With the above configuration, an area is dynamically set somewhere around a first terminal including a position of the first terminal on the basis of a state of a mobile object on which the first terminal is mounted and the position of the first terminal, and entry or approach of a second terminal to the area is determined. A signal for causing the second terminal to output an alarm for the entry or the approach is then provided for the second terminal. As a result, since the area is set somewhere around the first terminal in consideration of an element other than a distance to the terminal (mobile object), alarms can be appropriately given to a worker associated with the second terminal.

An alarm method according to another embodiment of the present disclosure used by a terminal (positioning terminal 10 or 10') includes determining a position of the terminal and outputting an alarm for entry or approach of the terminal to an area (new dangerous area) dynamically set at least somewhere around another terminal (positioning terminal 10B or 10B') including a position of the other terminal, the other terminal being different from the terminal and mounted on a mobile object (construction vehicle 50). The area is dynamically set based on a state of the mobile object and the position of the other terminal.

With the above configuration, an area is dynamically set somewhere around another terminal including a position of the other terminal on the basis of a state of a mobile object on which the other terminal is mounted and the position of the other terminal, and entry or approach of the terminal to the area is determined. The terminal then outputs an alarm for the entry or the approach. As a result, since the area is set somewhere around the other terminal in consideration of an element other than a distance to the terminal (mobile object), alarms can be appropriately given to a worker associated with the terminal.

An alarm system (alarm system 1 or 1') according to another embodiment of the present disclosure includes a first terminal (positioning terminal 10B or 10B') and a second terminal (positioning terminal 10 or 10'). The alarm system dynamically sets an area (new dangerous area) somewhere around the first terminal including a position of the first terminal based on a state of a mobile object (construction vehicle 50) on which the first terminal is mounted and the position of the first terminal. The alarm system determines entry or approach of a second terminal to the area. The alarm system performs at least one of processing for transmitting, to the first terminal, a first signal (alarm output instruction) for causing the first terminal to output a first alarm and processing for transmitting, to the second terminal, a second signal (alarm output instruction) for causing the second terminal to output a second alarm. The first terminal outputs the alarm in accordance with the first signal. The second terminal outputs the alarm in accordance with the second signal.

With the above configuration, an area is dynamically set somewhere around a first terminal including a position of the first terminal on the basis of a state of a mobile object on which the first terminal is mounted and the position of the first terminal, and entry or approach of a second terminal to the area is determined. A signal for causing at least one of the first terminal and the second terminal to output an alarm for the entry or the approach is then provided for at least one of the first terminal and the second terminal, and at least one of the first terminal and the second terminal outputs the alarm. As a result, since the area is set somewhere around the first terminal in consideration of an element other than a distance to the terminal (mobile object), alarms can be appropriately given to a worker associated with at least one of the first terminal and the second terminal.

An information processing apparatus (representative positioning terminal 10 or 10' or host server 20 or 20') according to another embodiment of the present disclosure includes a processor (processor 101, 101', 201, or 201') that dynamically sets an area (new dangerous area) somewhere around a first terminal (positioning terminal 10B or 10B') including a position of the first terminal based on a state of a mobile object (construction vehicle 50) on which the first terminal is mounted and the position of the first terminal and that determines entry of a second terminal (positioning terminal 10 or 10') into the area and a communicator (communicator 105, 105', 203, or 203') that transmits, to the second terminal, a signal (alarm output instruction) for causing the second terminal to output an alarm for the entry.

With the above configuration, an area is dynamically set somewhere around a first terminal including a position of the first terminal on the basis of a state of a mobile object on which the first terminal is mounted, and entry of a second terminal into the area is determined. A signal for causing the second terminal to output an alarm for the entry is then provided for the second terminal. As a result, since the area is set somewhere around the first terminal in consideration of an element other than a distance between the area and the second terminal, alarms can be appropriately given to a worker associated with the second terminal.

In the information processing apparatus, when the mobile object is traveling forward, the processor sets the area including a first part ahead of the mobile object and a second part, which is smaller than the first part, behind the mobile object. When the mobile object is traveling backward, the processor includes a third part behind the mobile object and a fourth part, which is smaller than the third part, ahead of the mobile object.

With this configuration, a person who is located ahead of or behind the mobile object and who is more likely to be exposed to danger (e.g., a worker carrying the second terminal or a worker driving another mobile object on which the second terminal is mounted) is more likely to be able to perform an operation or the like more safely, and excessive output of alarms can be suppressed in a side opposite the travel direction.

In the information processing apparatus, when the mobile object is turning right, the processor dynamically sets the area to the right of the mobile object relative to a forward direction. When the mobile object is turning left, the processor dynamically sets the area to the left of the mobile object relative to the forward direction.

With the above configuration, a person who is located to the left or right of the mobile object and who is more likely to be exposed to danger (e.g., a worker carrying the second terminal or a worker driving another mobile object on which the second terminal is mounted) is more likely to be able to perform an operation or the like more safely.

In the information processing apparatus, when a tip of an arm of the mobile object is rotating rightward relative to the forward direction of the mobile object, the processor dynamically sets the area to the right of the mobile object relative to the forward direction. When the tip of the arm of the mobile object is rotating leftward relative to the forward direction of the mobile object, the processor dynamically sets the area to the left of the mobile object relative to the forward direction.

With the above configuration, a person who is located to the left or right of the mobile object and who is more likely to be exposed to danger (e.g., a worker carrying the second terminal or a worker driving another mobile object on which the second terminal is mounted) is more likely to be able to perform an operation or the like more safely.

In the information processing apparatus, the processor adjusts size of the area in accordance with at least rotation speed or reach of the tip of the arm of the mobile object.

With the above configuration, the size of the area can be adjusted in accordance with a possibility of exposure to danger.

In the information processing apparatus (representative positioning terminal 10 or host server 20), the communicator (communicator 105 or 203) receives, from the second terminal (positioning terminal 10), a position of the second terminal determined based on RTK (real-time kinematic) processing.

With the above configuration, an accurate position of the second terminal can be obtained, and entry of the second terminal into the area can be determined more accurately.

In the information processing apparatus (representative positioning terminal 10' or host server 20'), the processor (processor 101' or 201') determines a position of the second terminal (positioning terminal 10') based on RTK processing.

With the above configuration, an accurate position of the second terminal can be obtained, and entry of the second terminal into the area can be determined more accurately.

In the information processing apparatus, the communicator transmits, to the first terminal, a signal (alarm output instruction) for causing the first terminal to output an alarm for the entry.

With the above configuration, a signal for outputting an alarm is also provided for the first terminal, and, for example, a person (worker) driving the mobile object on which the first terminal is mounted tends to notice that the person (worker) associated with the second terminal is located close thereto, and the worker associated with the second terminal is more likely to be able to perform an operation or the like more safely.

A terminal (positioning terminal 10 or 10') according to another embodiment of the present disclosure includes a processor (processor 101 or 101') that communicates with an information processing apparatus (representative positioning terminal 10 or 10' or host server 20 or 20') and that determines a position of the terminal, a communicator (communicator 105 or 105') that transmits the position of the terminal to the information processing apparatus and that receives, from the information processing apparatus, a signal (alarm output instruction) for causing the terminal to output an alarm for entry of the terminal into an area (new dangerous area) dynamically set somewhere around another terminal (positioning terminal 10B or 10B') including a position of the other terminal, the other terminal being different from the terminal and mounted on a mobile object (construction vehicle 50), and an alarmer (alarmer 103) that outputs the alarm in accordance with the signal. The area is dynamically set based on a state of the mobile object and the position of the other terminal.

With the above configuration, an area is dynamically set somewhere around another terminal including a position of the other terminal on the basis of a state of a mobile object on which the other terminal is mounted, and entry of the terminal into the area is determined. A signal for causing the terminal to output an alarm for the entry of the terminal into the area is then provided for the terminal. As a result, since the area is set somewhere around the other terminal in consideration of an element other than a distance between the area and the terminal, alarms can be appropriately given to a worker associated with the terminal.

In the terminal (positioning terminal 10), the processor (processor 101) determines the position of the terminal based on RTK processing.

With the above configuration, an accurate position of the terminal can be obtained, and entry of the terminal into the area can be determined more accurately.

An information processing method according to another embodiment of the present disclosure used by an information processing apparatus (representative positioning terminal 10 or 10' or host server 20 or 20') includes dynamically setting an area (new dangerous area) somewhere around a first terminal (positioning terminal 10B or 10B') including a position of the first terminal based on a state of a mobile object (construction vehicle 50) on which the first terminal is mounted and the position of the first terminal, determining entry of a second terminal (positioning terminal 10 or 10') into the area, and transmitting, to the second terminal, a signal (alarm output instruction) for causing the second terminal to output an alarm for the entry.

With the above configuration, an area is dynamically set somewhere around a first terminal including a position of the first terminal on the basis of a state of a mobile object on which the first terminal is mounted, and entry of a second terminal into the area is determined. A signal for causing the second terminal to output an alarm for the entry or the approach is then provided for the second terminal. As a result, since the area is set somewhere around the first terminal in consideration of an element other than a distance between the area and the second terminal, alarms can be appropriately given to a worker associated with the second terminal.

An alarm method according to another embodiment of the present disclosure used by a terminal (positioning terminal 10 or 10') includes determining a position of the terminal, transmitting the position of the terminal to an information processing apparatus (representative positioning terminal 10 or 10' or host server 20 or 20'), receiving, from the information processing apparatus, a signal (alarm output instruction) for causing the terminal to output an alarm for entry of the terminal into an area (new dangerous area) dynamically set somewhere around another terminal (positioning terminal 10B or 10B') including a position of the other terminal, the other terminal being different from the terminal and mounted on a mobile object (construction vehicle 50), and outputting the alarm in accordance with the signal. The area is dynamically set based on a state of the mobile object and the position of the other terminal.

With the above configuration, an area is dynamically set somewhere around another terminal including a position of the other terminal on the basis of a state of a mobile object on which the other terminal is mounted, and entry of the terminal into the area is determined. An alarm for causing the terminal to output an alarm for the entry is then provided for the terminal. As a result, since the area is set somewhere around the other terminal in consideration of an element other than a distance between the area and the terminal, alarms can be appropriately given to a worker associated with the terminal.

An alarm system (alarm system 1 or 1') according to another embodiment of the present disclosure includes an information processing apparatus (representative positioning terminal 10 or 10' or host server 20 or 20'), a first terminal (positioning terminal 10B or 10B'), and a second terminal (positioning terminal 10 or 10'). The information processing apparatus dynamically sets an area (new dangerous area) somewhere around the first terminal including a position of the first terminal based on a state of a mobile object (construction vehicle 50) on which the first terminal is mounted and the position of the first terminal, determines entry of the second terminal to the area, transmits, to the first terminal, a first signal (alarm output instruction) for causing the first terminal to output a first alarm, and transmits, to the second terminal, a second signal (alarm output instruction) for causing the second terminal to output a second alarm. The first terminal receives the first signal from the information processing apparatus and outputs the alarm in accordance with the first signal. The second terminal receives the second signal from the information processing apparatus and outputs the alarm in accordance with the second signal.

With the above configuration, an area is dynamically set somewhere around a first terminal including a position of the first terminal on the basis of a state of a mobile object on which the first terminal is mounted, and entry of a second terminal into the area is determined. A signal for causing the second terminal to output an alarm for the entry is then provided for the second terminal. As a result, since the area is set somewhere around the first terminal in consideration of an element other than a distance between the area and the second terminal, alarms can be appropriately given to a worker associated with the second terminal. In addition, with the above configuration, a person (worker) driving the mobile object on which the first terminal is mounted tends to notice that the person (worker) associated with the second terminal is located close thereto, and the worker associated with the second terminal is more likely to be able to perform an operation or the like more safely.

Further, any component termed with a suffix, such as "-er," "-or," or "-ar" in the present disclosure may be replaced with another term such as "circuit (circuitry)," "assembly," "device," "unit," or "module."

Although the embodiments have been described above with reference to the accompanying drawings, the present disclosure is not limited to such examples. It is obvious that a person skilled in the art can arrive at various variations and modifications within the scope described in the claims. It is understood that such variations and modifications also belong to the technical scope of the present disclosure as a matter of fact. Further, components in the embodiments described above may be arbitrarily combined without departing from the spirit of the present disclosure.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

When future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

The entire contents disclosed in the specification, the drawings, and the abstract contained in Japanese Patent Application No. 2022-004439 filed on Jan. 14, 2022 are hereby incorporated herein by reference.

INDUSTRIAL APPLICABILITY

An embodiment of the present disclosure is effective in an alarm technique for giving alarms to persons associated with mobile objects.

REFERENCE SIGNS LIST 1, 1' alarm system
10 (10A, 10B), 10' (10A', 10B') positioning terminal
20, 20' host server
30, 30' reference station data distribution server
40 monitor device
50 construction vehicle
101 (101A, 101B), 101' (101A', 101B'), 201, 201' processor
102A, 102B, 102A', 102B', 202 memory
103 (103A, 103B) alarmer
104A, 104B GNSS receiver
105 (105A, 105B), 105' (105A', 105B'), 203, 203' communicator
106A, 106B outputter
107A, 108B, 204 bus

The invention claimed is:

1. An information processing apparatus comprising:
a processor that dynamically sets an area somewhere around a first terminal including a position of the first terminal based on a state of a mobile object on which the first terminal is mounted and the position of the first terminal and that determines entry or approach of a second terminal to the area; and
a communicator that transmits, to the second terminal, a signal for causing the second terminal to output an alarm for the entry or the approach,
wherein the state of the mobile object is a state of movement of the mobile object,
wherein the processor sets the area such that a part of the area corresponding to a travel direction of the mobile object becomes larger than a part of the area opposite the part corresponding to the travel direction of the mobile object across the mobile object, and
wherein a size of a part of the area opposite the part corresponding to the travel direction of the mobile object across the mobile object being greater than zero.

2. The information processing apparatus according to claim 1,
wherein, when the mobile object is traveling forward, the processor sets the area including a first part ahead of the mobile object and a second part, which is smaller than the first part, behind the mobile object, and
wherein, when the mobile object is traveling backward, the processor sets the area including a third part behind the mobile object and a fourth part, which is smaller than the third part, ahead of the mobile object.

3. The information processing apparatus according to claim 1,
wherein, when the mobile object is turning, the processor sets the area such that a part of the area inside the turn becomes larger than a part of the area outside the turn.

4. The information processing apparatus according to claim 1,
wherein the state of the mobile object is a state of movement of a movable part that is included in the mobile object and that moves without accompanying movement of the mobile object.

5. The information processing apparatus according to claim 4,
wherein, when a tip of the movable part is rotating, the processor sets the area such that a part of the area inside the rotation becomes larger than a part of the area outside the rotation.

6. The information processing apparatus according to claim 5,
wherein the processor adjusts size of the area in accordance with at least one of rotation speed and/or reach of the tip of the movable part.

7. The information processing apparatus according to claim 6,
wherein, when the movable part is moving while the mobile object is moving, the processor sets the area such that the area becomes larger than when the movable part is moving while the mobile object is stationary.

8. An information processing apparatus comprising:
a processor that dynamically sets an area somewhere around a first terminal including a position of the first terminal based on a state of a mobile object on which the first terminal is mounted and the position of the first terminal and that determines entry or approach of a second terminal to the area; and
a communicator that transmits, to the second terminal, a signal for causing the second terminal to output an alarm for the entry or the approach,
wherein the communicator transmits a signal for causing the second terminal that has not been determined to be entering the area before the state of the mobile object changed but that is determined to be entering the area as a result of the change in the state of the mobile object to output an alarm different from an alarm for the second terminal that has been determined to be entering the area before and after the change in the state of the mobile object.

9. The information processing apparatus according to claim 1,
wherein the communicator receives, from the second terminal, a position of the second terminal determined based on Real-Time Kinematic (RTK) processing.

10. The information processing apparatus according to claim 1,
wherein the processor determines a position of the second terminal based on RTK processing.

11. The information processing apparatus according to claim 1,
wherein the communicator transmits, to the first terminal, a signal for causing the first terminal to output an alarm for the entry or the approach.

12. An information processing method performed by an information processing apparatus, the information processing method comprising:

dynamically setting an area somewhere around a first terminal including a position of the first terminal based on a state of a mobile object on which the first terminal is mounted and the position of the first terminal;

determining entry or approach of a second terminal to the area; and transmitting, to the second terminal, a signal for causing the second terminal to output an alarm for the entry or the approach, wherein the state of the mobile object is a state of movement of the mobile object, wherein the area is set such that a part of the area corresponding to a travel direction of the mobile object becomes larger than a part of the area opposite the part corresponding to the travel direction of the mobile object across the mobile object, and wherein a size of a part of the area opposite the part corresponding to the travel direction of the mobile object across the mobile object being greater than zero.

13. An alarm system, comprising:

a first terminal; and a second terminal, wherein the alarm system dynamically sets an area somewhere around the first terminal including a position of the first terminal based on a state of a mobile object on which the first terminal is mounted and the position of the first terminal, wherein the alarm system determines entry or approach of the second terminal to the area, wherein the alarm system performs at least one of processing for transmitting, to the first terminal, a first signal for causing the first terminal to output a first alarm and processing for transmitting, to the second terminal, a second signal for causing the second terminal to output a second alarm, wherein the first terminal outputs the alarm in accordance with the first signal, wherein the second terminal outputs the alarm in accordance with the second signal, wherein the state of the mobile object is a state of movement of the mobile object, wherein the alarm system sets the area such that a part of the area corresponding to a travel direction of the mobile object becomes larger than a part of the area opposite the part corresponding to the travel direction of the mobile object across the mobile object, and wherein a size of a part of the area opposite the part corresponding to the travel direction of the mobile object across the mobile object being greater than zero.

14. An information processing method performed by an information processing apparatus, the information processing method comprising:

dynamically setting an area somewhere around a first terminal including a position of the first terminal based on a state of a mobile object on which the first terminal is mounted and the position of the first terminal;

determining entry or approach of a second terminal to the area; and transmitting, to the second terminal, a signal for causing the second terminal to output an alarm for the entry or the approach, wherein the communicator transmits a signal for causing the second terminal that has not been determined to be entering the area before the state of the mobile object changed but that is determined to be entering the area as a result of the change in the state of the mobile object to output an alarm different from an alarm for the second terminal that has been determined to be entering the area before and after the change in the state of the mobile object.

*     *     *     *     *